FIG. I

ROBERT B. LONG
WARREN ALFRED KNARR   Inventors

By *Frank A. Dimmock*
Patent Attorney

X-RAY DIFFFACTION PATTERN
OF COMMERCIAL CuCl AND COMPLEXED CuCl
(ANGLES 10-36° SHOWN)
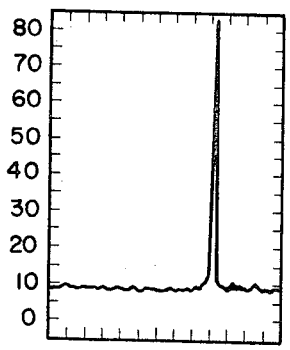
COMMERCIAL CuCl
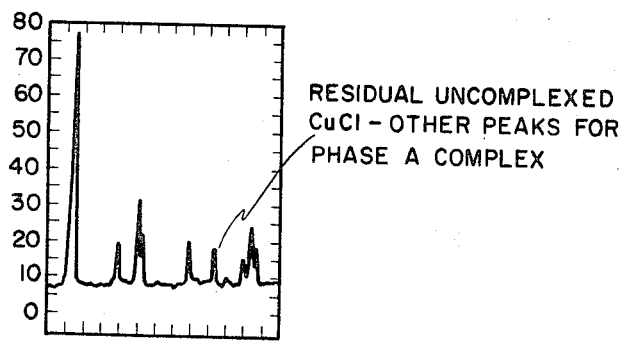
CuCl COMPLEX PRECIPITATED FROM
CONC. HCl - PHASE A
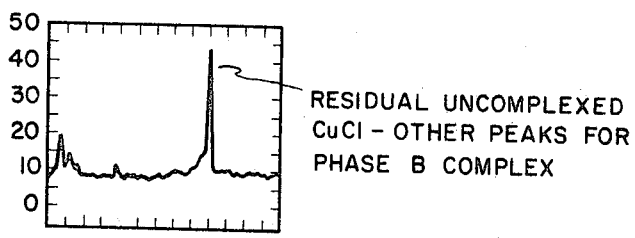
CuCl COMPLEX PRECIPITATED FROM
ISOBUTYLENE - PHASE B
Fig. 6
ROBERT B. LONG
WARREN ALFRED KNARR    Inventors ROBERT B. LONG
WARREN ALFRED KNARR   Inventors United States Patent Office 3,437,712
Patented Apr. 8, 1969

3,437,712
PROCESS FOR SEPARATING OLEFINS FROM ADMIXTURES WITH HIGH POROSITY CUPROUS HALIDE SALTS
Robert B. Long, Wanamassa, N.J., and Warren Alfred Knarr, Baton Rouge, La., assignors to Esso Research and Engineering Company, a corporation of Delaware
Continuation of application Ser. No. 333,925, Dec. 27, 1963. This application Nov. 2, 1966, Ser. No. 591,650
Int. Cl. C07c 7/16, 7/02; C01g 3/04
U.S. Cl. 260—681.5
19 Claims

ABSTRACT OF THE DISCLOSURE

Attrition-resistant, highly-porous particles of cuprous chloride or bromide are used for separations by preferential complexing of complexable compounds such as diolefins, olefins, etc. from vapor phase. The CuCl or CuBr particles are 10–60 micron macroparticles, composed of joined microparticles smaller than 5 microns, prepared by slowly precipitating a stable complex from a dilute solution of the cuprous halide in a mono-olefin and then decomposing the complex, leaving a porous structure.

---

Figure 1:
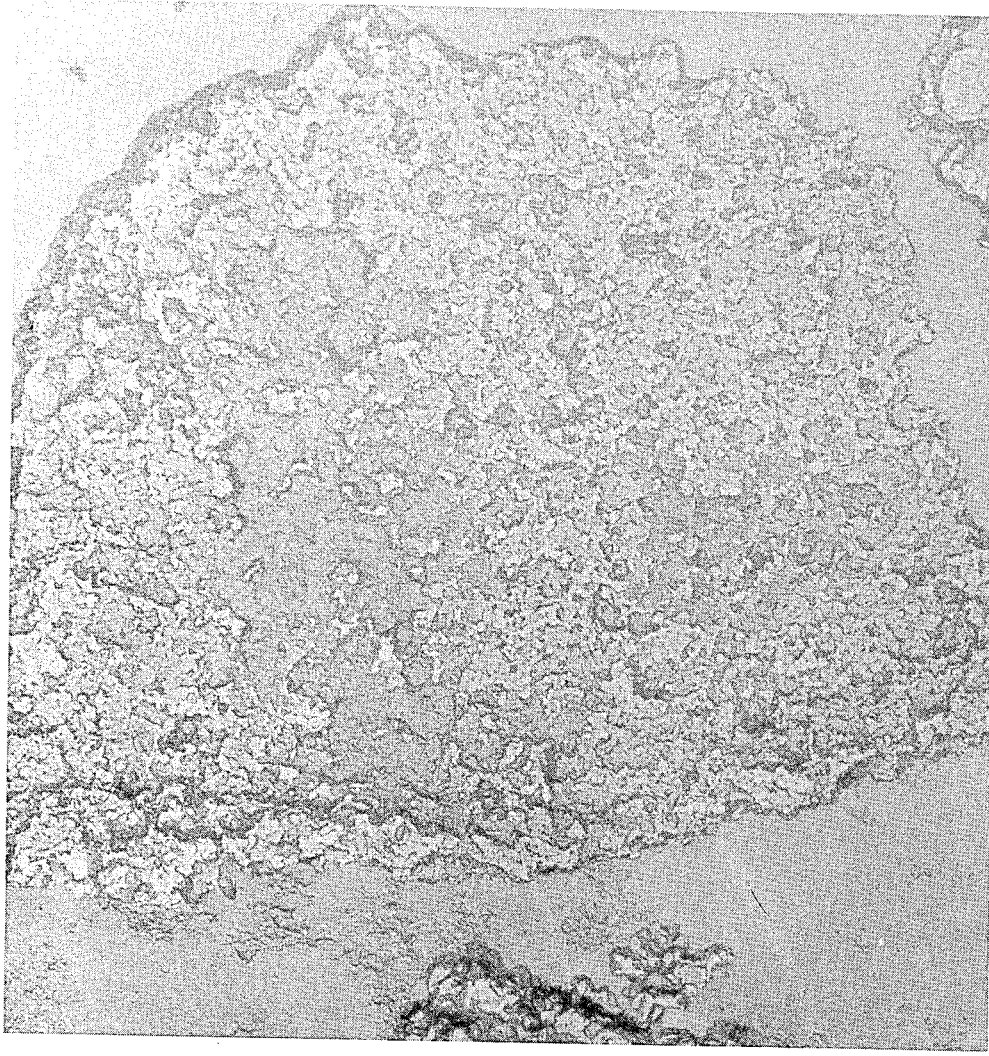

This application is the continuation of S.N. 333,925 filed Dec. 27, 1963 now abandoned.

This invention relates to new solid cuprous chloride or bromide complexing agents of unique structure, to processes for the preparation of such agents and to critical vapor phase processes for using such agents.

The field of effecting separation and recovery of unsaturates, e.g. butadiene, ethylene, etc., with solid cuprous chloride or bromide has been exhaustively explored particularly over the past 30 years. During this period, in addition to numerous publications some 50 patents have issued to seven major companies describing: (a) vapor phase and liquid phase processes; (b) fixed bed and moving bed, including fluidized solids, processes; (c) supported (to increase surface area) and unsupported cuprous salt processes; and (d) processes utilizing additional catalyts to improve the process. Despite all of this continuing activity and despite the enormous possible use for such a process (e.g., recovery of butadiene to compete with the presently used CAA and acetonitrile commercial processes) no use nor announcement of plans for use of a solid cuprous chloride or bromide process has been made by any company. Against this background of a large sustained research effort apparently failing to unlock the potential for cuprous chloride and bromide complexing, Dr. Robert B. Long a co-inventor in this patent application, discovered that highly porous (large pore), unsupported cuprous chloride or bromide particles of comparatively large size, i.e., above 10 microns yet having considerable strength despite this highly porous structure (able to stand up under repeated complexing-decomplexing cycles including fluid bed processes) could be prepared and that these particles had such astoundingly high activity in a vapor phase process as to make solid cuprous chloride and bromide complexing clearly economic and in fact, highly superior to competitive processes. This basic invention is fully described in a patent application S.N. 333,925 filed Dec. 27, 1963, now abandoned, entitled "Unique Complexing Agents" (C-912) filed with the present patent application and this patent application is hereby incorporated by reference to amplify the disclosure of the present application.

It has now been discovered that preferred highly porous (large pore) unsupported solid cuprous chloride or bromide particles of the general type disclosed by Dr. Robert B. Long but of critical structure, i.e., regular spherical shape, rigid macroparticles of continuously joined very small <5μ microparticles, the macroparticles being above 10μ, preferably above 50μ in size, providing high strength for circulation around cooling surfaces can be prepared by dissolving the cuprous chloride or bromide specifically in a monoolefin and effecting precipitation by addition of a diolefin, acetylene, nitrile or carbon monoxide under critical conditions. This preparation technique in addition to providing excellent large attrition resistant cuprous chloride or bromide particles is extremely economic in that a nearly quantitative recovery of complexed particles from the olefin is obtained. Thus, essentially all the cuprous chloride or bromide present in solution precipitates out due to the extremely low solubility of the complexed particles as compared to techniques such as precipitation of complexed particles from a concentrated HCl solution of the complex by addition of water where approximately ⅓ of the cuprous chloride or bromide complex remains in solution.

Figure 2:
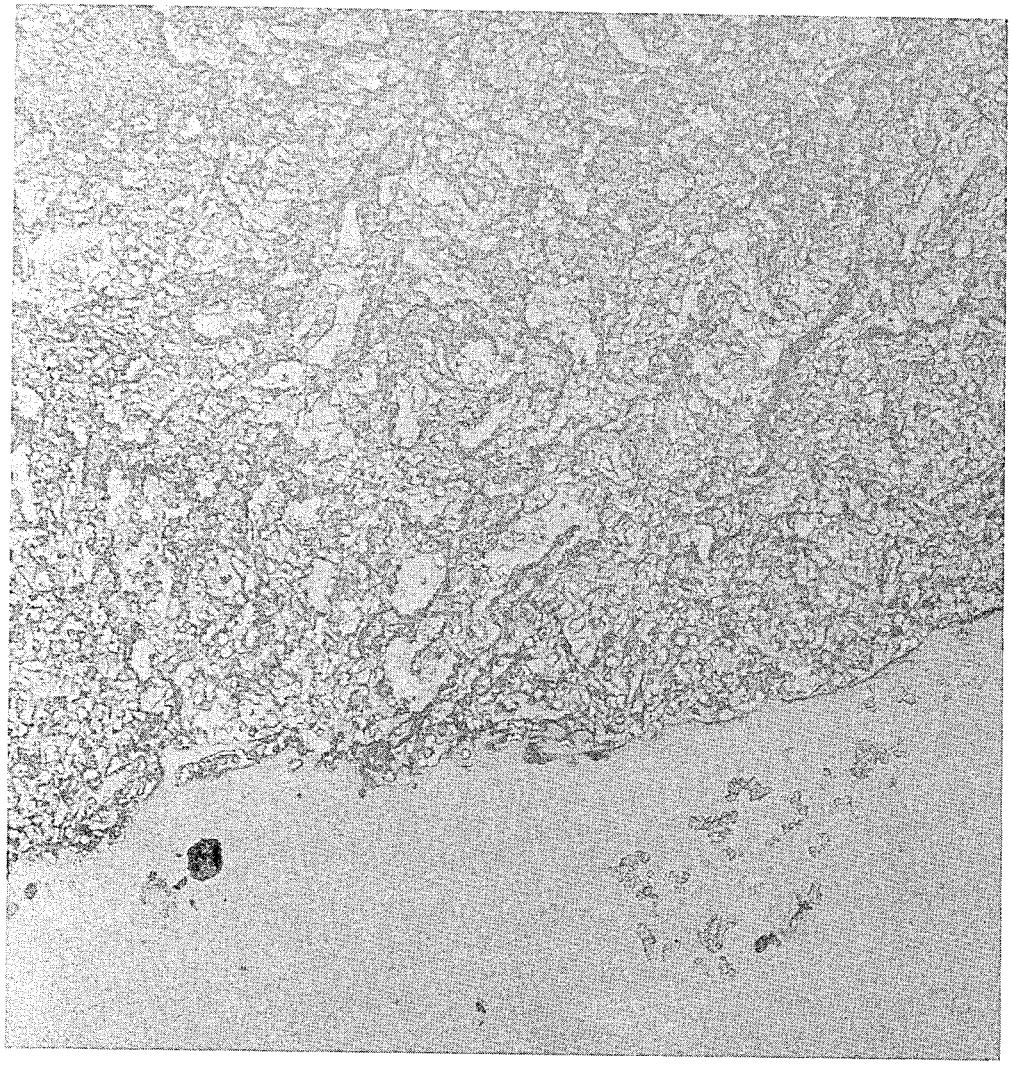
Figure 3:
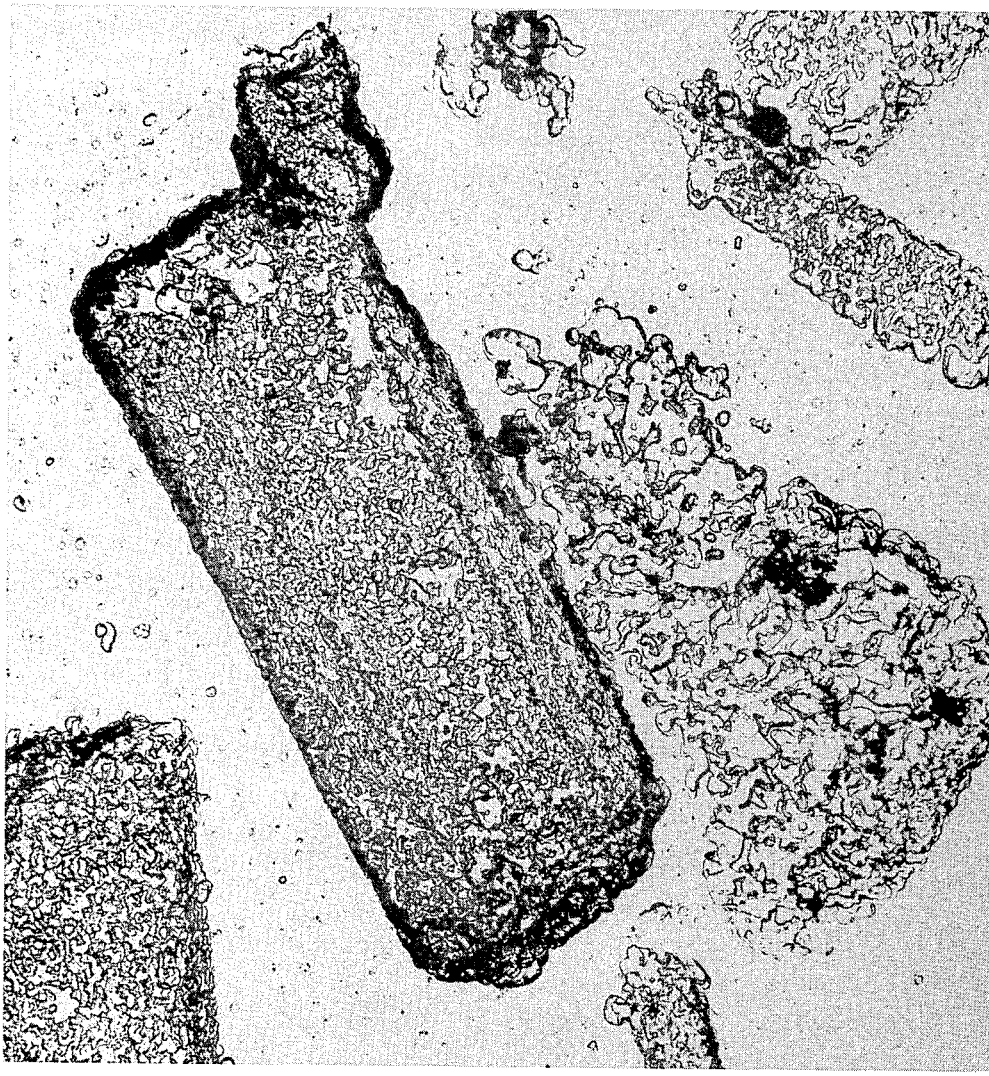

The structure of the present new preferred cuprous chloride and bromide particles is seen from the accompanying drawings which are reproductions of photomicrographs of typical actual samples. Referring to FIGURES 1 and 2, electron microscope pictures (magnification 10,000×) are presented of replicas (prepared by dusting particles on a polystyrene wafer, lightly pressing the wafer between two slides for 5 minutes at 330° F., cooling gradually, dissolving the copper salt out with HCl, coating the impression side with Germanium metal, coating with carbon vapor and finally dissolving away the polystyrene to leave a several hundred angstroms thin, carbon replica shadowed with germanium) of preferred particles of CuCl prepared by dissolving CuCl in butene-1 (FIG. 1) or in isobutylene (FIG. 2) completely removing any undissolved material and precipitating (growing) the complexed particles from the solution by extremely slow addition of gaseous butadiene in an efficiently stirred vessel. As can be seen the particles (shown after decomplexing) have a well defined highly porous spherical structure, the particular particles shown being about 20 and 100 microns in diameter respectively (the former smaller than optimum size particles being shown so that shape and edges can be seen). Additionally, as can be seen the individual pores shown are e.g. about 1600 A.–3200 A. in diameter. It is of interest to compare this material with porous cuprous chloride prepared by the precipitation of the butadiene complex from concentrated HCl added to water technique described in the Robert B. Long companion application previously referred to. Referring to FIGURE 3, an electron microscope picture of a replica (prepared as previously described) of such particles is presented for comparison. As can be seen the particles have sharply defined planar exterior boundary surfaces as compared to the true spherical shape of the present particles.

Figure 4:
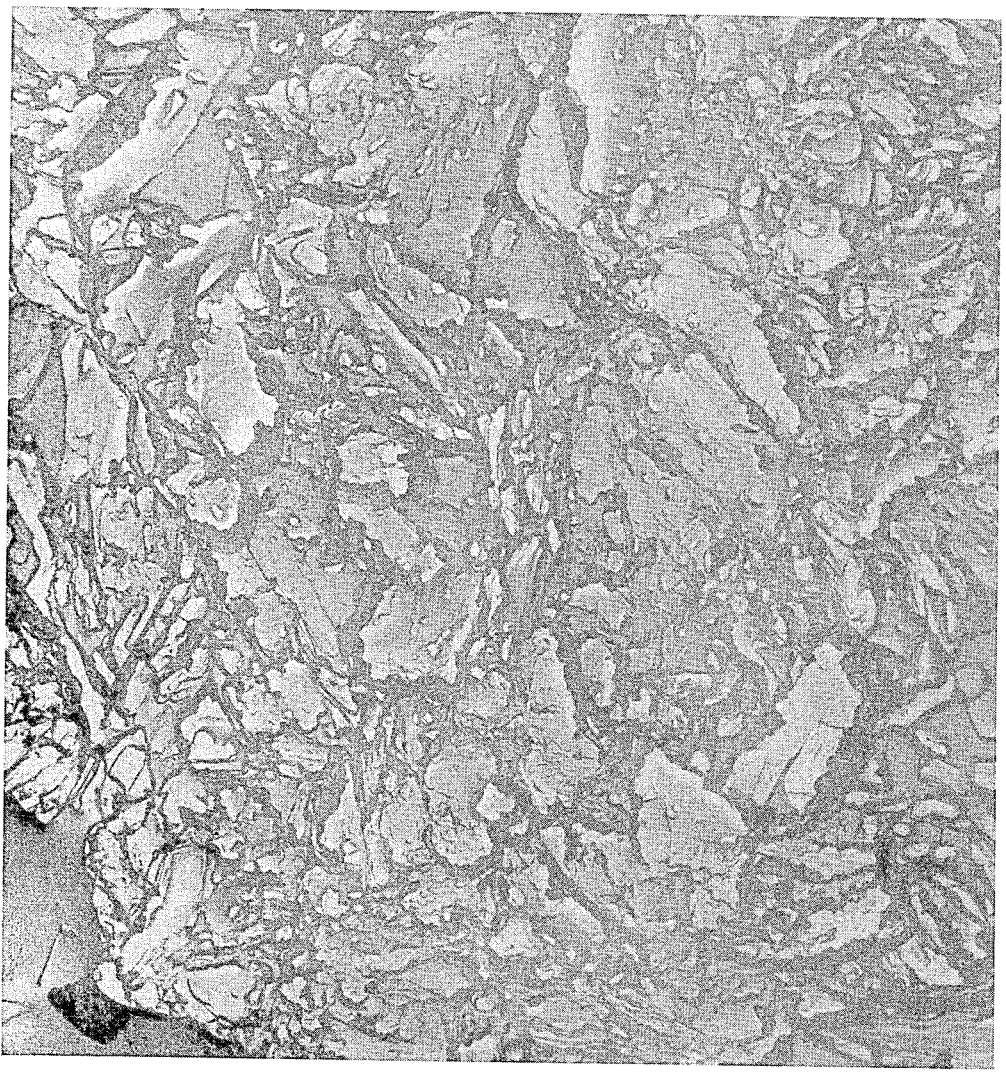
Figure 5:
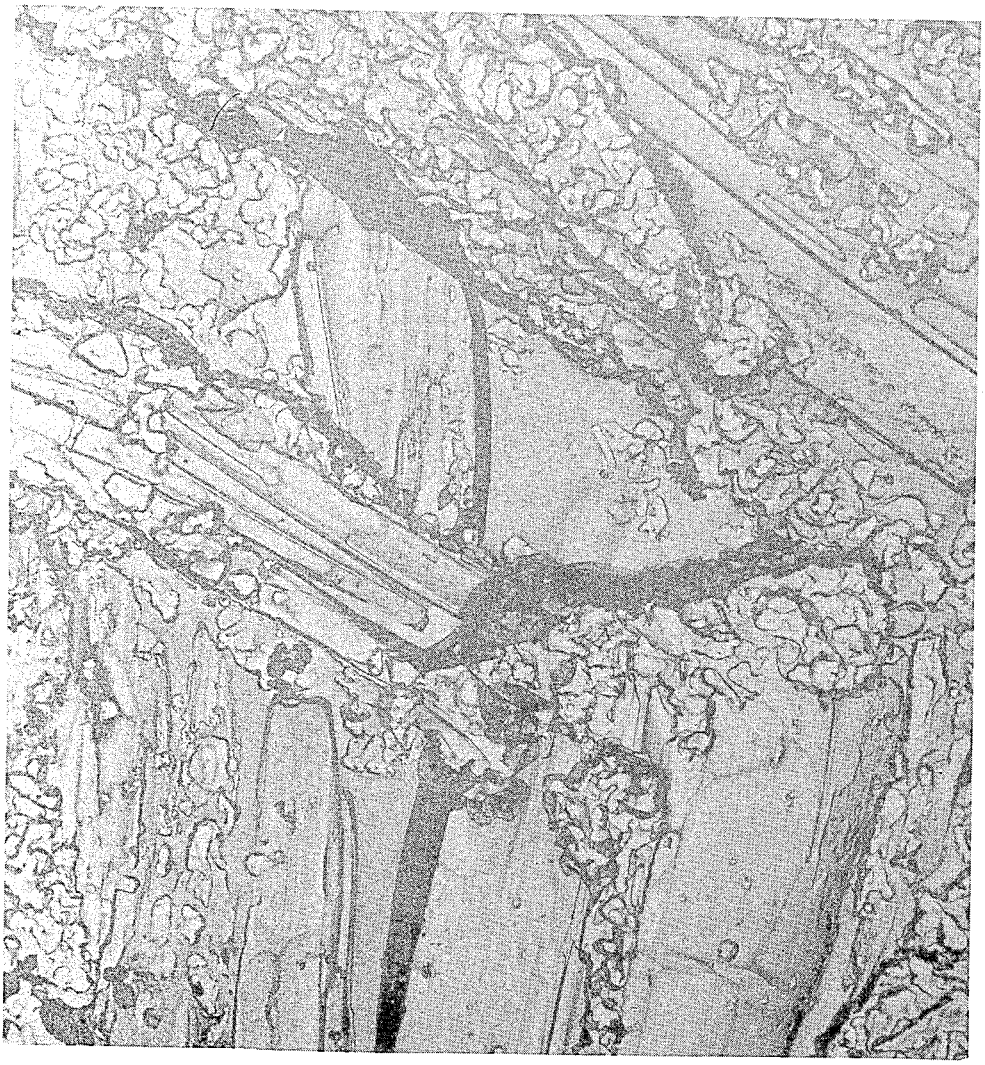

An even more important difference exists between the present particles precipitated from monoolefins and those prepared from concentrated HCl. Referring to FIGURE 4, an electron microscope picture of a replica (prepared as previously described except that the complexed particles were dusted on a polystyrene wafer softened with a drop of ethylene dichloride and pressed at room temperature to prevent decomplexing) of complexed (rather than decomplexed) particles prepared by dissolving CuCl in isobutylene and precipitating with butadiene is presented. Also, presented as FIGURE 5 is a similar picture of the complexed particles prepared from concentrated HCl. As can be seen the particles prepared from monoolefin complex are macroparticles of continuously joined very small microparticles below 5μ in size, e.g. 2–3μ while the particles prepared from concentrated HCl are single particles of above 5μ e.g. 10–15μ. It is noted that the larger, e.g., 100μ particles prepared from concentrated HCl are macroparticles of these same above 5μ microparticles. The difference in basic microparticle structure, i.e., the spherical macroparticles of small microparticles, is postulated to be responsible for the excellent attrition resistance over extremely long periods of use in a fluid bed observed with the present large spherical particles prepared from monoolefins. A physical measurement also describes a significant difference. Referring to FIGURE 6, X-ray diffraction patterns are presented of uncomplexed CuCl (commercial C.P.—same for active material of this invention) and of complexed CuCl precipitated from concentrated HCl versus complexed CuCl precipitated from monoolefins (isobutylene shown) in each case by addition of butadiene. It can be seen that uncomplexed CuCl has the typical pattern for a cubic crystal and that the complex precipitated from a monoolefin has a much less complex pattern than does the complex prepared from concentrated HCl, and also has a large peak of residual complexing agent (this peak has been completely removed in some monoolefin preparations and is always low after several cycles use). The additional peaks on the complex from concentrated HCl pattern are postulated to be either residual hydrates, alcoholates, etc. or a different crystal structure. In either event it is significant that it has been found that after several cycles of vapour phase absorption in a fluid bed that the complex prepared from concentrated HCl has the identical pattern of the complex prepared from monoolefin solution except that it has a higher peak for residual uncomplexed CuCl. This indicates that higher capacities should be obtained with particles prepared from monoolefins.

It is noted that the "exterior" (outer surface macroparticles and interior microparticles) form of the particles is primarily due to the nature of the solution (e.g. HCl versus monoolefins, from which the complex was prepared). The "internal" (highly porous within macroparticles and microparticles) structure of the cuprous chloride derived from dissociation of the complex depends only on the choice of the proper complexing material (as will be described) and the purity of the original CuCl. Thus, the same highly porous particles are obtained from the dissociation of the 2CuCl-1 butadiene complex regardless of whether the particles of complex are grown in, e.g., acid or monoolefin solution (as can be seen from a comparison of the Hg and $CCl_4$ porosimeter data reported in the present example vs. the data reported in the Robert B. Long companion application previously referred to).

The present new cuprous chloride and bromide complexing agents have the following physical characteristics:

(1) Size—above about 50%, preferably above about 65%, more preferably above about 80% by weight of 10–600μ, more preferably 20–300μ, yet more preferably 30–200μ, most preferably 50–150μ rigid macroparticles composed of continuously joined <5μ, e.g. predominantly 1–3μ microparticles. Preferably the macroparticles are regular, uniform size spheres. In all embodiments the particles are regular unitary (rigid continuously joined structures, not small particles physically aggregated by surface effects only) particles slowly grown from solution as complexed macroparticles composed of continuously joined <5μ microparticles (rather than agglomerates of small particles rapidly nucleated from solution and then physically combined by surface attractions only, i.e. typical agglomerates have considerably less strength than the present invention particles). It is noted that X-ray measurements show a very small 400–1300 A., usually 600–1100 A. basic crystals size within the macroparticle composed of continuously joined microparticles. This basic crystal size was found to be in general identical regardless of the preparation technique. It is beleived that the walls of the membrane separating the pores are thus probably only several basic crystals thick, i.e. from the e.g. 2000 A. wall thicknesses shown on the electron micrographs. It is remarkable that open porosity sponge-like particles are so crystalline and have such unusual strength in e.g. fluid bed use. The large spherical macroparticles composed of <5μ microparticles are particularly desirable since the smooth spherical structure has been found to provide excellent attrition resistance, e.g., in fluid bed use and in addition it has been found that the present large 50–150μ spheres provide excellent smooth fluidization over a wide range of gas rates along with high activity and capacity. It should be noted that despite the fact that these smooth spheres are macroparticles of continuously joined microparticles, the open porosity for complexing throughout the crystal persists (shown by porosimeter).

(2) Porosity—above 10%, more preferably above 15%, yet more preferably above 25%, most preferably above 35% of total volume of the particle pores of 550/10,000 A. diameter, preponderantly above 2000 A. diameter. Also, preferably particles have 0.1–15%, preferably 0.3–5%, most preferably 0.5–3% of total volume of pores of 1–550 A., preferably 70–550 A. (small pores permit condensation but amount is small enough so as not to limit activity on complexing or strippability (for product purity) due to diffusion ilimitations). It should be noted that the present large pore porosity is unusual in that conventional porous solids such as cracking catalyst, catalyst supports, adsorbents including molecular sieves, all have the bulk of their pore volume smaller than 100 A.

(3) Purity—preferably above 90% CuCl or CuBr, more preferably above 95%, yet more preferably above 97.5%, most preferably above 98.5% (the higher purities are desirable not only to obtain high activity and capacity i.e. development of high large pore porosity but also to increase mechanical strength and to prevent polymerization and polymer laydown on the particles in sustained multicycle use).

(4) Surface area—preferably above 2 m.$^2$/gm., e.g. 3–20 m.$^2$/gm. It is noted that the higher surface areas within the above range are not per se preferred because of stripping problems associated with higher surface areas.

The new cuprous chloride or bromide particles of this invention (as well as a general method of preparation of above 10μ active CuCl or CuBr particles from monoolefin) are prepared by the steps of slow precipitation (growth) of crystalline cuprous chloride or bromide diolefin, acetylene, nitrile or carbon monoxide complex particles by the direct addition of the respective complexing agent or the complexing agent and an antisolvent to a monoolefin solution of the cuprous salt whereby solid cuprous chloride or bromide complex particles above 10μ average are formed and dissociating said precipitated solid complex to obtain after dissociation the highly active porous cuprous salt. In general any method may be used so long as (1) uniform solid complexed (preferably complexed to above 50% of theoretical capacity, more preferably above 80%, most preferably above 90%) crystals slowly precipitate (i.e. are formed or grow) from solution in a size above about 10μ; and (2) preferably either (a) the purity of the CuCl or CuBr used (or that dissolved and in solution) is above 85%, preferably above 90%, more preferably above 95%, or (b) complexed particles are grown slowly from a solution having appreciable solubility for the complex so as to reject impurities in said growth. Thus, it has now been found (as will be defined and demonstrated below) with respect to the former that critical slow rates of crystal growth or faster rates with choice of a particular monoolefin having unique properties i.e. appreciable solubility for the complex are required to produce the large (above 10μ, and other preferred size ranges recited above) strong porous particles required for efficient multicycle use in fluidized bed or other contacting involving circulation around cooling and heating coils. Additionally, with respect to the former it was found to be highly desirable (to obtain the preferred large e.g. 50–150μ regular spheres) with any monoolefin solvent to decant from or preferably filter out undissolved CuCl or CuBr to obtain a clear solution prior to precipitation. With respect to the latter it has been found that growth from butene-1 solution (0.00 wt. percent solubility) requires high e.g. above 90% purity CuCl or CuBr to obtain the highest, large pore porosity.

The following data and discussion define the critical conditions required to produce the >10μ size active particles necessary for efficient multicycle use in fluidized bed contacting or other contacting involving circulation around cooling and heating coils. The conditions for obtaining the preferred large size e.g. 50–150μ, regular uniform spherical particles of this invention are also described.

A series of eight runs were made under similar general conditions to determine the effect of rate of precipitation of the complex, kind of olefin solvent used, and purity of the original salt on the particle size of the complex formed (same particle size found for the porous CuCl or CuBr particles derived by dissociation of the complex, i.e. there is no apparent shrinking of the particles on dissociation of the complex). Porosimeter measurements of porosity of the samples from low, i.e. 87.5% purity CuCl were also made.

Figure 7:
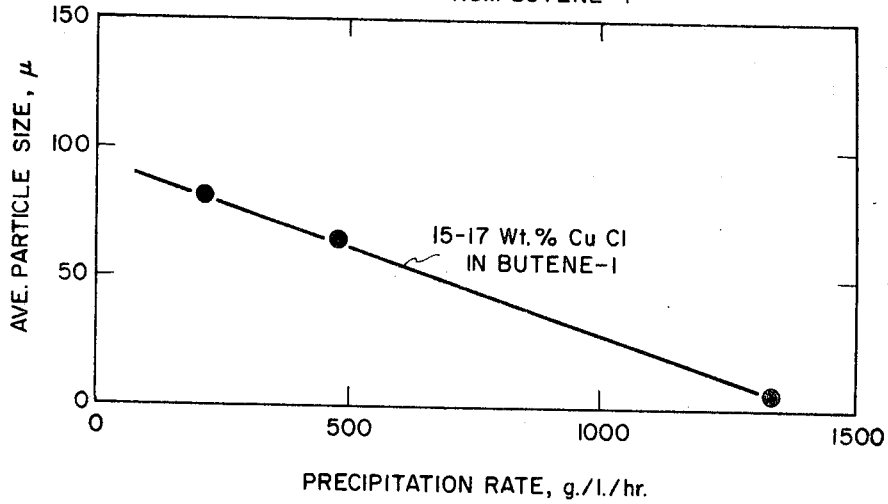
Figure 8:
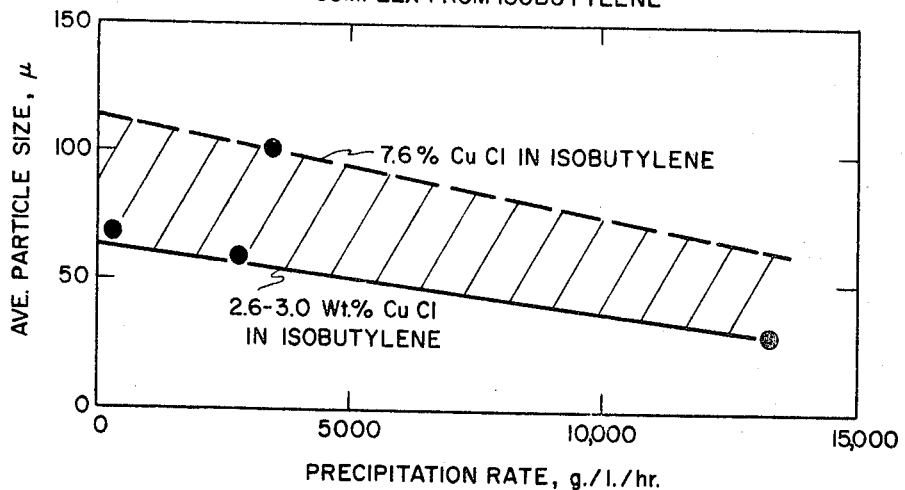

The general procedure used was to prepare about 1 liter of a solution of CuCl in the liquid olefin at about −15° C. by mixing commercial CuCl with the liquid olefin for about 2 hours, then allowing excess undissolved CuCl to settle and decanting the clear supernatant solution through a porous glass filter into a second stirred vessel at −10 to −18° C. Gaseous butadiene was then charged to the stirred solution and the time required before noticeable precipitation occurred as well as the time required to add the stoichiometric amount of butadiene to form the 2CuCl-1 butadiene complex was noted. After the stoichiometric amount of butadiene and a small excess had been added, the solution was allowed to warm up in a butadiene atmosphere with stirring to evaporate off hydrocarbon to obtain the dry precipitate of complex. The particle size of the complex (the same as the particle size of the porous CuCl obtained from it) was measured under a microscope using a magnification of 100×, and the precipitation rate was calculated from the amount of complex formed per liter of solution and the time required to reach stoichiometric butadiene addition. The pertinent data are shown in the following table:

lustrated in FIGURES 7 and 8 which also show that the particle size obtained from butene-1 solution is much more sensitive to precipitation rate than for isobutylene solution. For example, to get good particle size for fluidization from butene-1 solution, the precipitation rate should be kept less than 1000 grams/liter/hour and more preferably less than 500 grams per liter per hour. On the other hand with isobutylene solutions of CuCl, the precipitation rate can be over 13,000 g./l./hr. for 3 wt. percent solutions and much higher than that for more concentrated solutions.

It was also found in connection with the lower purity Mallinkrodt (87.5% CuCl) samples that precipitation from butene-1 and isobutylene respectively produced the following pore volume distributions.

| | | Pore Volume, c.c/gm. | | |
|---|---|---|---|---|
| | CCl₄, 800 A. | 70–550 A. | Hg Porosimeter, 550–10,000 A. | 10,000+ A. |
| Butene-1 | 0.01 | 0.003 | 0.046 | 0.466 |
| Isobutylene | 0.01 | 0.004 | 0.144 | 0.150 |

The lower than optimum large pore (550–10,000 A.) pore volume for the particles precipitated from butene-1 is significant. It is noted that the percent of theoretical amount of butadiene for the 2 CuCl:1 butadiene complex was 50% for the complexed particles precipitated from butene-1 and 90% for the particles from isobutylene. Although this is responsible in part for the low pore volume, the other examples show that large pore porosity is relatively low despite high percent of theoretical capacity in original complex with technical grade 85% CuCl and butene-1. Therefore high purity is preferred with butene-1 even if it is possible to obtain a high percent of theoretical capacity original complex.

This large difference in allowable precipitation rate is a result of the difference in solubility of the 2CuCl-1 butadiene complex in butene-1 vs. isobutylene, pentene-1, and hexene-1 and the resulting effect on nucleation rate for the production of new crystals. The solubility of the above complex has been measured and found to be 0.00 wt. percent in butene-1 at −7° C., 0.52 wt. percent in isobutylene at −10° C., 0.26 wt. percent in pentene-1 at 0°C. (0.15 wt. percent in pentene-1 at 13° C.) and 0.42 wt. percent in hexene-1 at −10° C. Thus the presence of very small amounts of butadiene in a solution of CuCl in butene-1 tends to cause fairly large supersaturation and the resulting extensive nucleation of new crystals. Thus, rapid nucleation would occur throughout the addition of butadiene (unless it is added at very slow rates) and very

| Olefin Solvent | Source of Orig. CuCl | CuCl Purity, Percent | Crystallization Temp., ° C. | CuCl Conc. in Sol'n, g./l. | Point When Crystals First Noted | | Time to Add Stoich. Butad., min. | Precipitation Rate, g./l./hr. | Particle Size of Product, microns |
|---|---|---|---|---|---|---|---|---|---|
| | | | | | Time From Start of C₄, min. | C₄⁻⁻ Conc. in Sol'n, Percent | | | |
| 1-Butene | B&A C.P. | 98.6 | −12 | 141 | 10 | 2.9 | 50 | 215 | 100% 60 to 100 regular spheres. |
| Do | Mallinkrodt | 87.5 | −10 | 119 | 22 | 3.3 | 18.7 | 485 | 25 to 100 rough spheres evenly distributed through size range. |
| Do | B&A C.P. | 98.6 | −10 | 143 | 1.5 | 1.6 | 20 | ¹ 1,340 | Mostly 1 to 10 fines with a few particles up to 125. |
| Isobutylene | B&A C.P. | 98.6 | −10 | 18 | 0.5 | 1.4 | 0.5 | 2,740 | Mostly 10 to 125 rough cluster-type particles; ave. size =60 with 20% 20. |
| Do | B&A C.P. | 98.6 | −11 | 55 | (²) | (²) | 1.2 | 3,490 | 80 to 125 cluster-type particles, no fines. |
| Do | B&A C.P. | 98.6 | −10 | 21 | (²) | (²) | 0.12 | 13,300 | 1 to 100; ave.=30 particles of very irregular shape, about 20% fines under 20. |
| Do | Mallinkrodt | 87.5 | −10 | 22 | 7.7 | 1.0 | 5.1 | 328 | 30 to 110 with about 20% fines under 10. |

¹ Rapid addition at the beginning of the precipitation and slower at the end. The rate of 1,340 g./l./hr. is for the first 20% of stoichiometric addition of butadiene.
² Unknown.

The above data show a definite trend toward smaller particles as precipitation rate is increased for both the isobutylene and butene-1 solutions. Furthermore, there appears to be an effect of concentration of CuCl in the solvent for isobutylene where a higher initial concentration of CuCl gives larger particles. These effects are illustrated tiny crystals result. Therefore, with moonolefin solvents in which the solubility of the complex (under the conditions of precipitation) is less than 0.1, preferably less than 0.05 wt. percent the present invention >10μ particles are prepared by limiting complexing agent addition rate to get less than 1,500 g./l./hr., preferably less than 1,000 g./l./hr. of complex. It is noted that although butadiene and butene-1 data are presented, that the above applies also to other complexing agents and monoolefin solvents. To prepare the preferred larger size regular spherical particles, e.g. 50–150μ rates <500, preferably <300 g./l./hr. are preferred. It is noted that in the above experiments filtration (preferred to produce large particles) prior to precipitation was conducted.

On the other hand, the relatively high solubility of the butadiene complex in isobutylene, pentene-1 and hexene-1 makes the addition rate of butadiene much less critical. It is relatively easy to add gaseous butadiene to the solution with sufficient mixing to avoid the high degree of supersaturation which causes formation of new nuclei for precipitation of crystals of complex. Thus, growth of a relatively smaller number of nuclei is favored and large spherical particles of the complex are more readily obtained. Thus, the present >10μ active particles may also be prepared by choosing a solvent having a solubility for the complex greater than 0.05, preferably greater than 0.1, more preferably greater than 0.2 wt. percent and using higher precipitation rates, preferably to prepare the large e.g. 50–150μ particles <2500, more preferably <1000 g./l./hr. In a preferred embodiment with these solvents and complexing agents it is preferred (to obtain large e.g. 50–150μ particles) to use concentrations of cuprous salt solutions greater than 5, preferably greater than 7 wt. percent.

With respect to the required purity of the cuprous halide added to the monoolefin, preferably the cuprous halide in solution, it has now been found that the purity should be preferably above 90%, more preferably above 95%, yet more preferably above 96.5% in monoolefins having a low solubility for the complex i.e. <0.1 wt. percent, preferably <0.05 wt. percent, e.g. butene-1 for the highest large pore, pore volume to be developed upon dissociation. For monoolefins in which the solubility of the complex is greater than 0.05 wt. percent, preferably >0.1 wt. percent, more preferably >0.2 wt. percent lower purities may be used without deleteriously affecting high large pore, pore volume. However, it is still preferred to use high purity cuprous halide as above described to prevent the deleterious effect of impurities on sustained use e.g. polymerization and also to obtain highest capacities.

Any monoolefin solvent having appreciable solubility for the cuprous salt, preferably high solubility monoolefins may be used to prepare the present new cuprous chloride or bromide particles. Preferred solvents are $C_3$–$C_{12}$, preferably $C_4$–$C_8$ aliphatic, cyclic or alicyclic monoolefins, preferably also α-monoolefins, e.g. propylene, butenes, branched and straight chain pentenes, hexenes, heptenes, cyclopentenes, octenes, dodecenes, etc. having appreciable solubility may be used. Especially preferred are isobutylene, butene-1, pentene-1 and hexene-1 which have been found to be high solubility solvents. Mixtures of these solvents may also be used. These solvents must of course be used under suitable conditions to be in the liquid phase. The monoolefin solvent may of course contain additional materials such as paraffins but this is not preferred since these reduce the solubility of the solvent for CuCl or CuBr.

It is noted that in some cases addition of the complexing agent creates extremely high supersaturation of the complex in the solvent before crystal growth begins to occur. This is particularly true with butene-1, pentene-1 and hexene-1 where the CuCl which was dissolved was of low purity, e.g., 98.6% CuCl. In such cases it is particularly desirable to filter the solution prior to addition of complexing material which usually causes the complex to precipitate. Alternatively, in a less preferred embodiment suitable antisolvents which are at least partially miscible with the solvent may be added to effect precipitation. This may in a less preferred embodiment be done in connection with any preparation. Particularly preferred antisolvents are $C_3$–$C_{12}$ or higher paraffins, naphthenes, or aromatics, preferably paraffins (aliphatic, cyclic or alicyclic). Most preferable are $C_4$–$C_8$ paraffins, e.g., butane, isobutane, pentanes, hexanes, heptanes, octanes, cyclopentane, cyclohexane, etc.

Suitable complexing agents which can be used as described to prepare the active cuprous chloride and bromide of this invention are any normally gaseous or liquid complexing compounds which form a stable complex having a ratio of copper to complexing compound greater than 1, preferably 2 or more. Such compounds are those having more than 1 pi bond per molecule. Such compounds include both materials which form only complexes having said ratios of copper to complexing compound greater than 1 and compounds which form complexes having a ratio of 1 or less which upon decomplexing pass through a stable complex having a ratio of copper to complexing compound greater than 1. Thus, the present inventors have found experimentally that certain materials, e.g. nitriles, diolefins, acetylenes, carbon monoxide under ordinary conditions forming a 2:1 complex can be made to complex in ratios of copper to complexing compound of 1:1 or less. However, upon dissociation complexing material is released selectively from the bed of cuprous chloride or bromide until the stable above 1:1, e.g. 2:1 stoichiometric complex is completely formed before further decomplexing to the uncomplexed cuprous chloride or bromide occurs. In this specification by "stable complex" is meant a stoichiometric complex stable upon dissociation as described in the preceding sentence. As will be further discussed in the examples in connection with the experimental data it is the stable complex having a ratio of copper to complexing material of above 1:1 from which the large pores develop upon dissociation (due to the bonding of one molecule of the complexing material to more than one copper atom). It is noted that wherever in this specification diolefins, acetylenes, nitriles, or carbon monoxide are mentioned in connection with the preparation technique it is intended that these other compounds can be used. Preferred materials are carbon monoxide and $C_2$–$C_{12}$ or higher organic compounds containing at least one of the following functional groups: (1)

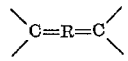

(polyolefins), (2) —C≡C— or (3) —C≡N and mixtures of these, wherein R is C or an alkylene group. More than one of these functional groups may be present in a single molecule. In addition other functional groups may be present so long as these do not interfere with complex formation. Preferred materials are $C_3$ to $C_{10}$ or higher, preferably $C_3$ to $C_6$ conjugated or nonconjugated aliphatic, cyclic or alicyclic diolefins, or less preferably polyolefins, e.g. allene, butadiene, isoprene, piperylene, octadienes, cyclohexadiene, cyclooctadiene, divinyl benzene, cyclododecatriene; $C_2$ to $C_{10}$ or higher, preferably $C_2$ to $C_6$ aliphatic or alicyclic acetylenes or acetylenes containing additional unsaturation, acetylene, methyl acetylene, propyl acetylene, phenyl acetylene, vinyl acetylene, etc.; and $C_2$ to $C_{10}$ or higher, preferably $C_2$ to $C_6$ aliphatic or alicyclic saturated or unsaturated nitriles, e.g. acetonitrile, acrylonitrile, propionitrile, phenylnitrile, methacrylonitrile, ethacrylonitrile, etc. Pure streams or dilute streams (diluted with an inert gas or natural dilute petroleum streams, e.g. butadiene diluted with butene and butanes) can be used so long as the diluent does not interfere with the precipitation of the desired solid complex.

Small spheres and large spheres of small microparticle size are preferably prepared from conjugated diolefins, most preferably from $C_4$ to $C_6$ diolefins. Specifically it has been found that $C_4$= and $C_5$= produce these materials while allene, acetylenes and CO tend to produce larger microparticles.

Reaction conditions for the above described precipitation or growth of complexed particles which yield upon dissociation the desired new particles of this invention preferably must meet both of the following criteria: (1) temperatures and pressures within which the desired complex is stable i.e. below dissociation conditons and (2) temperatures and pressures within which the CuCl or CuBr dissolved remains in solution. In general suitable stable complex temperatures and pressures vary with the particular complex and are in the range of −80 to 110° C., preferably −40 to 60° C., and pressures are in the range of 2 to 300 p.s.i.a., preferably 14.7 to 150 p.s.i.a. Stable conditions for specific complexes are given in the literature or can be easily determined experimentally. In general higher pressures and lower temperatures within the above ranges as is well known stabilize the complexes together. In addition it is essential to maintain conditions during precipitation within which uncomplexed CuCl or CuBr are soluble and will not precipitate out. Preferred such conditions are as follows:

particles which also contain small amounts of small e.g. 70–500 A. pores, these small pores permit partial condensation in these pores and nucleation occurs to obtain much higher capacities and activities than are otherwise obtained.

It is noted that although both the cuprous chloride and the cuprous bromide new complexing agents of this invention used in commercial complexing separations provide real improvements over prior art material, the new cuprous chloride complexing agent is preferred. Thus, the new cuprous chloride as compared to the new cuprous bromide, complexes at higher temperatures and/or lower pressures and additionally has higher activity (shorter gas residence times may be used).

The unique new cuprous chloride and bromide particles of this invention are preferably used unsupported in vapor phase separation processes in which the said

|  |  | Temperature | Pressure, atmos. |
|---|---|---|---|
| CuCl: |  |  |  |
| Butene-1 | Preferred | −80 to 30° C. | 0.1 to 10. |
|  | Most preferred | −40 to 0° C. | 1 to 3. |
| Isobutylene | Preferred | −40 to 100° C. | 2.5 to 100 P.s.i.a. |
|  | Most preferred | −23 to −12° C. | 7 to 45 P.s.i.a. |
| Pentene-1 | Preferred | −40 to 40° C. | 0.1 to 10. |
|  | Most preferred | −20 to 20° C. | 1 to 3. |
| Hexene-1 | Preferred | −80 to +30° C. | 0.1 to 10. |
|  | Most preferred | −50 to +10° C. | 1 to 3. |
| CuBr: |  |  |  |
| Butene-1 | Preferred | −120 to 0° C. | 0.1 to 10. |
|  | Most preferred | −80 to −30° C. | 1 to 3. |
| Isobutylene | Preferred | −120 to −10° C. | 0.1 to 10. |
|  | Most preferred | −80 to −50° C. | 1 to 3. |
| Pentene-1 | Preferred | −120 to 0° C. | 0.1 to 10. |
|  | Most preferred | −80 to −30° C. | 1 to 3. |

Failure to meet the requirements of either (1) or (2) results in lower amounts of large pore (550/10,000 A.) pore volume as measured by mercury porosimeter and lower activity and capacity. Thus (1) results in incomplete formation of the complex in a particular particle and (2) results in precipitation also of uncomplexed particles having essentially no porosity. With respect to (1) where low porosity is encountered with a particular complexing compound this can to some extent be improved by lowering temperature or increasing pressure to create a larger driving force toward formation of the complex.

It is preferred to dissociate the complex box in preparation of the active particles and especially in multicycle use in effecting commercial separations in the substantial absence of liquids, i.e. to efficiently strip or wash the particles of liquids including those wetting the surfaces and pores before effecting dissociation of the complex in the decomplexer and also in the prestripper where partial dissociation is used to obtain higher product purities. This is necessary because it has been found that liquids having some appreciable solubility for the complex present during dissociation tend to anneal the large pores and thus reduce activity. Alcohols have been found to be particularly deleterious and liquid monoolefin solvents such as butene-1, isobutylene, pentene-1, and hexene-1 also should be excluded. It is noted that some of these such as isobutylene and butene-1 tend to be completely stripped in raising temperatures for dissociation but it is still preferred to use care to obtain essentially complete removal before the dissociation or partial dissociation stripping step. Other deleterious materials are liquid nitriles and water. It is noted that the dissociation step appears to be critical, i.e. the main annealing occurs when these liquids are present during dissociation and little annealing occurs at other stages in the preparation or commercial use of the particles.

Finally and of very great importance it is preferred to conduct complexing in the vapor phase at a temperature within 15° C., preferably within 10° C., more preferably within 5° C. of the dewpoint. It has been found that with the new high large pore (550/10,000 A.) porosity unsupported particles are continuously circulated in contact with cooling surfaces, e.g. utilized as a fluid bed or otherwise suspended (e.g. dilute phase vs. dense phase fluid bed) in flowing vapors, utilized as a mechanically mixed bed, etc. Suitable examples of equipment to achieve the latter are e.g. rotary cement kilns, (the rotor itself may carry all or part of the cooling coils), vibrating baffles, use of stirrers, etc. In all cases sufficient movement of the particles should be achieved to obtain efficient heat transfer between the cooling (or for desorption heating) coils and the particles. In connection with the highly preferred or necessary embodiment of using the new porous particles unsupported it is particularly necessary that the particles not be used in prior art embodiments such as coating supports with a heavy oil to retain fine particles on the surface thereof. Such a technique which would fill the large pores with heavy oil would severely reduce the activity and capacity of the present new high large pore porosity particles, particularly the preferred large 50/150μ spheres of this invention. Thus, the open access of the particles to the vapors would be largely lost.

The process may be either continuous with circulation of solids between two beds (one operated on absorption and the other on desorption) or cyclic i.e. the same reactor operated first on absorption and then on desorption. It should be noted that the processes described in this paragraph depend for their success on the new highly active, high capacity, relatively large porous particles of surprising strength of this invention. Thus, the high heat release obtained when unsaturates complex with cuprous salts, i.e. 8–28 kilocalories per gram mole is known. To remove this heat released in seconds with the present new particles requires for satisfactory yields of unsaturates from moderately concentrated streams extremely efficient removal of heat obtainable only by circulation of the solids in contact with a large cooling surface area. The present new particles have sufficient strength to withstand such circulation without decrepitation. As an example of the problem and lack of alternate solutions of it, it can be calculated for ethylene which has a 10 kilocalories heat of reaction and a molecular weight of 28, that the reactor bed of a fixed bed reactor will operate 30° C. hotter than the feed stream if there is only 4–5% of total feed ethylene recovery. For a 10% ethylene recovery based on total feed, the temperature rise would be theoretically 70° C. Since Cu salts are such poor heat conductors, it is almost impossible to remove heat fast enough from a fixed bed by cooling coils, etc. to prevent this temperature rise. Thus, the alternatives available for fixed bed operation are (1) use a very large fixed bed of cuprous salt and operate at sufficiently low flow rates that the reaction heat can be removed by cooling coils, (2) accept a relatively low yield of the desired product, or (3) refrigerate the feed to very low temperatures before feeding it into the reactor. The first of these nullifies the value of a high activity cuprous salt and is expensive, the second is undesirable because it requires large reactors and feed streams for a given amount of product which is also expensive and the third is both expensive and often cannot be done at the desired operating pressure without condensation of the feed to the liquid state.

The full value of a high activity, high capacity cuprous salt as a complexing agent for separation processes can best be obtained by using the fluidized bed (dense phase) technique with a gaseous feed stream. In this latter case overall heat transfer coefficients greater than 50 B.t.u./hr. sq. feet of heat exchange surface have been readily attained and it is possible to control the temperature of the fluidized bed by conventional indirect heat transfer. Laboratory experiments in the recovery of butadiene from its mixtures with other hydrocarbons show that a fluidized CuCl bed using CuCl prepared by the method of the present invention can be operated 8–10° C. above the temperature of the cooling agent in the cooling coils while recovering 95% of the butadiene in a hydrocarbon feed stream containing about 30 mole percent butadiene. If a fixed bed of active CuCl were used the bed would have to operate 180° C. above the gas inlet temperature to recover only 90% of the butadiene. Such a temperature rise is essentially impossible and the steady state butadiene yield would automatically limit itself to about 25% of the butadiene in the feed at a temperature rise of about 50° C. above the feed gas inlet temperature. Some slight improvement over this yield is possible because of the sensible heat of the reactor and CuCl fixed bed, but this is relatively minor.

Figure 9:
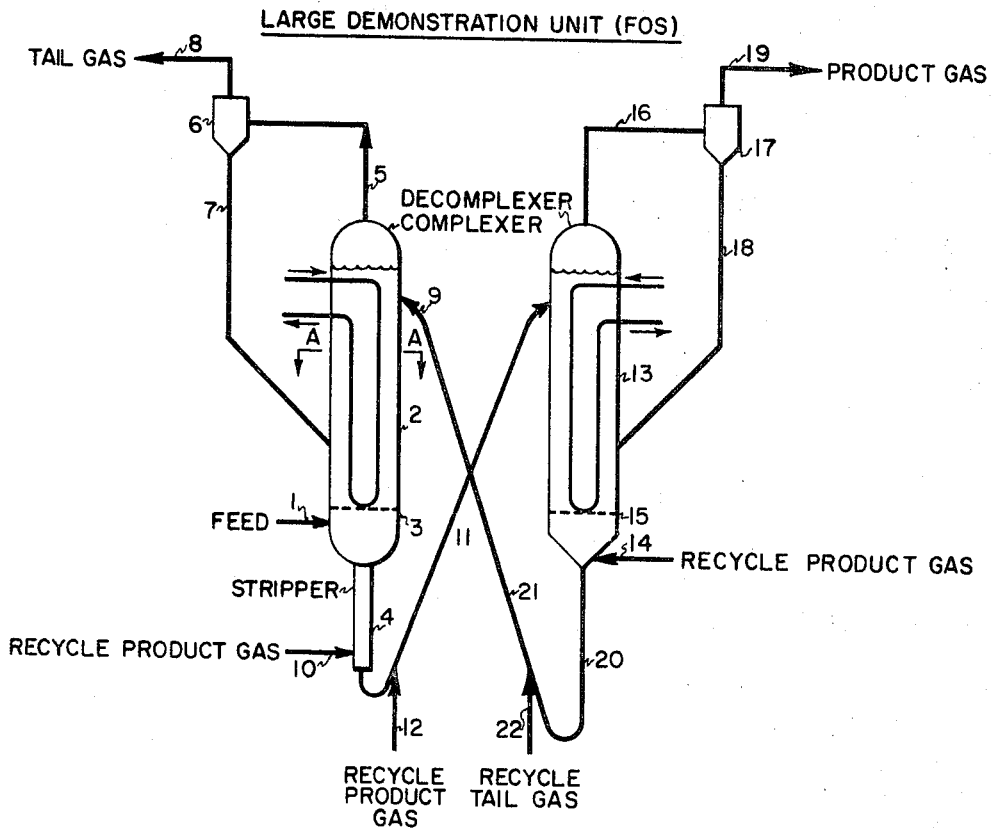
Figure 9A:
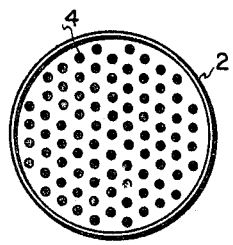

A preferred apparatus for carrying out the preferred process (circulation of solids between two fluidized beds one operated on absorption and one on desorption) for utilizing the present new cuprous chloride or bromide particles is depicted in the accompanying drawing, FIGURE 9. Referring to the drawing vaporous feed is supplied through line 1 to complexer reaction vessel 2 containing a bed of cuprous chloride or bromide particles supported on distribution plate 3 and fluidized by the feed vapors. The reaction vessel is 2 ft. in diameter and contains approximately 100 1" O.D. heat transfer tubes to remove the enormous heat released in complexing. The distribution of these tubes is shown in the cross sectional view FIG. 4A (through A—A) of the reactor vessel 2 showing the heat transfer tubes 4. As can be seen the free area is only approximately 80% of the total area. Tail gas vapors leaving the fluid bed are passed overhead through line 5 to cyclone 6 from which entrained solids are returned to the reactor through line 7 and tail gas is removed through line 8. Desorbed particles are supplied near the top of the fluid bed through line 9 and flow downwardly through the fluid bed and bypass the distribution plate 3 through downcomers (not shown) to a stripper 4 where they are heated and/or stripped of nonselectively absorbed feed. Stripping gas may be supplied through line 10 or stripping may be effected primarily by heating. Particles are then passed upward through lift line 11 with lift gases being supplied through line 12 to the upper section of the fluid bed of decomplexer 13. This decomplexer also contains the approximately 100 heat transfer tubes described in connection with the complexer vessel 2. Particles flow downward through the fluid bed in vessel 13 where they are fluidized by fluidization stripping gas supplied through line 14, the particles again being supported by a gas distribution baffle 15. Overhead gases containing the desired product separated are passed through line 16 to cyclones 17 where solids entrained are separated and returned through line 18 to the reactor and the desired pure product gases are passed from the system through line 19 to storage. Desorbed cuprous chloride or cuprous bromide particles are passed through line 20 back to reactor 2 through lift line 21 with lift gases being supplied through line 22. In an especially preferred embodiment all of the stripping and lift gases are the product and tail gases respectively from the process. Thus, the stripping gas for the decomplexer and for the stripper and the lift gas to transport the CuCl or CuBr to the decomplexer is the high purity product gas (prevents contamination or dilution of the product gas). With respect to the lift gas used to supply decomplexed particles to the complexer this is the tail gas from the absorber. Thus, no additional impurities or dilution of the tail gas occurs. Of course, other stripping and lift gases, e.g. nitrogen, hydrocarbons, etc. can be used but these should be chosen so as not to interfere with complexing or decomplexing and so as to be separable, e.g. by distillation from the pure product recovered by complexing and also preferably from the tail gas.

In a preferred embodiment to obtain maximum product purity the particles withdrawn from the bottom of the absorber are slowly and uniformly heated as they pass downwardly through the stripper, the heat being supplied either by heat transfer tubes (not shown) or by heated stripping gas, preferably by both. Preferably the residence times and temperatures are adjusted to obtain partial decomplexing of 1–10%, preferably 3–6%, of the compound complexed contained in the particles. The amount of stripping gas is preferably limited both to effect savings in stripping gas requirements and in the preferred embodiment where product gas from the desorber is used as the stripping gas to minimize recontamination of the particles by impurities contained in said stripping gas. Preferred amounts of stripping gas are 1–10 vol. percent, preferably 2–7 vol. percent, based on the amount of gas contained in the complexed particles passed to the stripper. In an additional preferred embodiment to obtain vary high purity product the final stripping is conducted substantially with gases evolved from the partial decomplexing of the particles or with a minimum amount of additional stripping gas, preferably product gases, or more preferably a pure stripping gas such as nitrogen, to permit smooth flow of the particles. This latter embodiment provides maximum protection against contamination both by impurities in the stripping gas and by impurities in the gases evolved from the particles (impurities swept off the surface). Extremely high purities are obtained in the separation of butadiene from refinery $C_4$ streams (e.g. from steam cracking) by expedients such as described above.

The present new cuprous chloride and bromide particles and the above described processes for their use may be used in effecting more economic separations of any compound capable of forming a complex with cuprous chloride or cuprous bromide. Thus, this includes all the separations described in the voluminous prior art previously referred to and additional compounds which it has been discovered complex with cuprous chloride and bromide. Preferred materials which complex with cuprous chloride or bromide are inorganic materials such as carbon monoxide and organic materials containing up to about 16 carbon atoms, preferably up to about 12 carbon atoms, more preferably up to about 8 carbon atoms. The higher boiling materials can be complexed in the vapor phase by techniques such as the use of vacuum, carrier gases, etc. Any materials may be used as carrier gases which do not interfere with the complexing reaction e.g. inert gases, organic or inorganic materials. Examples of preferred materials which complex with cuprous chloride or bromide are $C_2$–$C_{16}$, preferably $C_2$–$C_{12}$, more preferably $C_2$–$C_8$, compounds having one or more of the following functional groups through which the complex is capable of being formed:

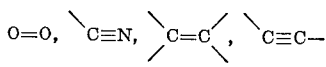

Carbon monoxide is suitable for use as the material which complexes. Additionally, unsaturated carbonyl compounds such as propenal, butenal, pentenal, and the like; the various unsaturated ketones such as 1-butene-3-one, 1,4-pentadiene-3-one, 2-pentene-4-one, and similar ketones may be employed. In general the alkane nitriles such as methane nitrile, ethane nitrile, propane nitrile, and higher nitriles are useful. Aryl, alkaryl and arylalkyl nitriles also complex with cuprous salt and may be used to form the liquid complex precursor. Unsaturated nitriles, such as acrylonitrile, methacrylonitrile, and ethacrylonitrile are further examples of ligands suitable for use in the present process. Ligands having a combination of functional groups selected from the list recited above are less preferred alternates. Also, other functional groups may be present so long as these do not interfere with complex formation.

Examples of olefins are ethylene, propylene, butylene, isobutylene, pentenes, etc.

While alpha, non-alpha, straight and branched chain olefins are all employable, alpha olefins appear to complex more readily, presumably due to the absence of steric hindrance and are preferred. Di and triolefins such as propadiene, butadiene, isoprene, dicyclopentadiene, cyclopentadiene, octadiene, cyclododecatriene and the like, readily complex. Olefinic aromatic compounds such as styrene and the like may also be employed. The acetylenes such as methyl, ethyl, vinyl, propyl acetylenes and the like, as well as acetylene per se are also useful as ligands. It should be noted that compounds containing functional groups in addition to the functional group(s) through which the complex is formed may also be employed since they do not ordinarily interfere with complexing. Also, compounds containing more than one functional group through which the complex is capable of being formed may be proper choice of conditions (chosen based on the temperature pressure dissociation curve) be separated from another compound having one of the same functional groups, e.g. acrylonitrile from acetonitrile.

Preferred complexing and decomplexing conditions used for effecting preferred commercial separations using the above described system are as follows: (Preferred superficial velocity fluidization rates 0.05–5.0, preferably 0.15–1.0 ft./sec.)

BUTADIENE SEPARATED FROM CRUDE BUTADIENE

|  | Preferred | Most Preferred |
|---|---|---|
| Complexing: | | |
| Temperature, °C | −10 to 70 | 0 to 40. |
| Pressure, atmos | 0.5 to 10 | 1 to 5. |
| Gas Residence Time, seconds | 1 to 400 | 15 to 150. |
| Solids Residence Time, minutes | 10 to 200 | 20 to 100. |
| Decomplexing: | | |
| Temperature, °C | 40 to 100 | 60 to 90. |
| Pressure, atmos | 0.5 to 10 | 1 to 5. |
| Gas Residence Time, seconds | 1 to 400 | 15 to 150. |
| Solids Residence Time, minutes | 5 to 200 | 10 to 100. |

ETHYLENE SEPARATED FROM STEAM CRACKING $C_2$-STREAM

|  | Preferred | Most Preferred |
|---|---|---|
| Complexing: | | |
| Temperature, °C | −50 to 40 | −30 to 20. |
| Pressure, atmos | 1 to 100 | 10 to 60. |
| Gas Residence Time, seconds | 1 to 400 | 15 to 150. |
| Solids Residence Time, minutes | 10 to 200 | 20 to 100. |
| Decomplexing: | | |
| Temperature, °C | −5 to 100 | 35 to 75. |
| Pressure, atmos | 1 to 100 | 10 to 60. |
| Gas Residence Time, seconds | 1 to 400 | 15 to 150. |
| Solids Residence Time, minutes | 5 to 200 | 10 to 100. |

ACRYLONITRILE SEPARATED FROM ACETONITRILE

|  | Preferred | Most Preferred |
|---|---|---|
| Complexing: | | |
| Temperature, °C | −10 to 80 | 0 to 50. |
| Pressure, atmos | 0.5 to 10 | 1 to 5. |
| Gas Residence Time, seconds | 1 to 400 | 15 to 150. |
| Solids Residence Time, minutes | 10 to 200 | 20 to 100. |
| Decomplexing: | | |
| Temperature, °C | 50 to 140 | 70 to 120. |
| Pressure, atmos | 0.5 to 10 | 1 to 5. |
| Gas Residence Time, seconds | 1 to 400 | 15 to 150. |
| Solids Residence Time, minutes | 5 to 200 | 10 to 100. |

NOTE. For the nitrile separations an inert carrier gas, such as $N_2$, $CH_4$ etc. must be used to prevent condensation at the high pressures.

CARBON MONOXIDE SEPARATED FROM HYDROGEN

|  | Preferred | Most Preferred |
|---|---|---|
| Complexing: | | |
| Temperature, °C | −25 to 100 | −10 to 60. |
| Pressure, atmos | 0.5 to 100 | 1 to 60. |
| Gas Residence Time, seconds | 1 to 400 | 15 to 150. |
| Solids Residence Time, minutes | 10 to 200 | 20 to 100. |
| Decomplexing: | | |
| Temperature, °C | 20 to 140 | 40 to 120. |
| Pressure, atmos | 0.5 to 100 | 1 to 60. |
| Gas Residence Time, seconds | 1 to 400 | 15 to 150. |
| Solids Residence Time, minutes | 5 to 200 | 10 to 100. |

ALLENE SEPARATED FROM METHYL ACETYLENE

|  | Preferred | Most Preferred |
|---|---|---|
| Complexing: | | |
| Temperature, °C | −40 to 70 | −20 to 40. |
| Pressure, atmos | 0.5 to 25 | 1 to 15. |
| Gas Residence Time, seconds | 1 to 400 | 15 to 150. |
| Solids Residence Time, minutes | 10 to 200 | 20 to 100. |
| Decomplexing: | | |
| Temperature, °C | 30 to 115 | 50 to 100. |
| Pressure, atmos | 0.5 to 25 | 1 to 15. |
| Gas Residence Time, seconds | 1 to 400 | 15 to 150. |
| Solids Residence Time, minutes | 5 to 200 | 10 to 100. |

PIPERYLENES SEPARATED FROM CYCLOPENTENE

|  | Preferred | Most Preferred |
|---|---|---|
| Complexing: | | |
| Temperature, °C | −10 to 80 | 0 to 70. |
| Pressure, atmos | 0.1 to 5 | 1 to 3. |
| Gas Residence Time, seconds | 1 to 400 | 15 to 150. |
| Solids Residence Time, minutes | 10 to 200 | 20 to 100. |
| Decomplexing: | | |
| Temperature, °C | 40 to 125 | 60 to 100. |
| Pressure, atmos | 0.1 to 5 | 1 to 3. |
| Gas Residence Time, seconds | 1 to 400 | 15 to 150. |
| Solids Residence Time, minutes | 5 to 200 | 10 to 100. |

NOTE. To operate with piperylenes at low temperature and the higher pressures a carrier gas such as nitrogen must be used.

The present invention will be more clearly understood from a consideration of the following examples and the laboratory data contained therein.

EXAMPLE 1.—GASEOUS BUTADIENE SLOWLY ADDED TO A 24 WT. PERCENT BUTENE-1 SOLUTION OF B&A C.P. CuCl (98.6% CuCl)

9.5 ft.³ of butene-1 was condensed (0.89 liter) in a 2-liter flask immersed in a Dry Ice alcohol bath. 200 grams of Baker and Adamson (B&A) C.P. CuCl was added and the flask was stirred for 2 hours at −20° C. Butadiene was added so slowly below the surface that an initial formation of precipitate did not occur until 5 minutes had elapsed. At this point the solution started turning yellow and a yellow complex precipitate began to appear and grew in quantity to a yellow slurry. During precipitation the temperature rose from −20 to −5° C.

Excess butadiene and butene-1 were evaporated off and a fine granular yellow powder remained. This material was decomplexed by heating and found to contain approximately the theoretical amount of butadiene for the 2CuCl:1 butadiene complex. The particles were found to have excellent large pore structure, activity and capacity as well as excellent particle size (75/100μ micron regular spheres) and good fluidization characteristics (see table in Example 7).

EXAMPLE 1A.—GASEOUS BUTADIENE ADDED (FASTER RATE) TO A 24 WT. PERCENT BUTENE-1 SOLUTION OF BAKER'S C.P. CuCl (96.5% CuCl)

14.6 ft.$^3$ of butene-1 were condensed (1.38 liters) in a 2-liter flask immersed in a Dry Ice alcohol bath and 593 grams of (Baker's analyzed) CuCl was added with stirring over a 2 hour period at —20° C. Undissolved cuprous chloride was allowed to settle out and a clear (about 24 wt. percent CuCl) solution was decanted into a separate flask at —20° C. 2.4 ft.$^3$ of gaseous butadiene was added with stirring and the temperature gradually rose to —5° C. A yellow complex precipitate appeared almost immediately (fast addition of butadiene) and this continued to grow in quantity to a yellow slurry. Again excess butadiene and butene-1 were evaporated off and a yellow powder was obtained, which was found to have approximately the theoretical amount of butadiene for the 2CuCl-1 butadiene complex. This material had the good large pore porosity and activity and capacity, but had poor, very small particle size (mainly 5 microns) and fluidized very poorly. This example indicates that slow addition of complexing agent is necessary to obtain uniform regular particles of large enough size for good fluidization.

EXAMPLE 1B.—GASEOUS BUTADIENE ADDED (FASTER RATE) TO A 24 WT. PERCENT BUTENE-1 SOLUTION OF TECHNICAL GRADE (85%) B&A CuCl

The same general procedure as in Example 1 was used except that 36 ft.$^3$ of butene-1 (3.37 liters) was used with 470 grams of technical grade B&A (Baker and Adamson) cuprous chloride added. The solution was filtered and the clear (about 24 wt. percent CuCl) solution was placed in 5 liter resin pot and 7½ ft.$^3$ of butadiene was added. The particles after dissociation had relatively poor large pore volume and additionally were mainly 5 microns in size and had very poor fluidization properties and low fluid bed activity because of both relatively low large pore volume and poor fluidization. This example indicates that it is necessary to start with high purity CuCl or CuBr to obtain the relatively high, large pore porosity. Thus, apparently slow growth alone is not enough and the impurities block the desired growth and development of large pore porous structure.

EXAMPLE 1C.—CRITICAL NUCLEATION RATE IS AT THE BEGINNING OF COMPLEX PRECIPITATION 300 grams B&A C.P. CuCl was added to 1 liter of butene-1 and the solution was stirred at —15° C. for two hours. The solution was filtered (30 wt. percent CuCl solution estimated obtained as the filtrate). Butadiene was added over a period of approximately 3 to 4 hours to the stoichiometric amount and then additional butadiene was added until about 1.5 times the stoichiometric amount had been supplied. No precipitate was noted during the first hour of butadiene addition so the rate of addition was markedly increased. Precipitate then appeared almost immediately. Again this material appeared to have slightly larger particle size than Example 1B, but was still quite fine and fluidization (this time without glass beads) was still very poor, i.e. balling occurred into balls about ⅛" in diameter, excessive fines were lost, rough fluidization, etc. The capacity was found to be 54 to 63 wt. percent and the activity was not measured due to the poor contacting in the fluidized bed. A roller analysis of particle size as follows was obtained (after fluidization) but this analysis shows only the balling that had occurred, i.e. essentially all the small particles balled as described. It is noted that roller analyses of this type are obtained with particles below about 10μ.

Roller analysis

| Particle size μ | Fraction of sample, wt. percent |
|---|---|
| 0–10 | 0 |
| 6–20 | 0.9 |
| 20–50 | 0.90 |
| 50–70 | 10.11 |
| 75–120 | 3.48 |
| 100+ | 85.42 |

This example shows that the critical precipitation rate is at the beginning of crystal formation and that high rates at this point lead to very small particles.

EXAMPLE 2.—GASEOUS BUTADIENE SLOWLY ADDED TO A 12 WT. PERCENT BUTENE-1 SOLUTION OR B&A C.P. CUPROUS CHLORIDE 11.4 ft.$^3$ of butene-1 was condensed (1.08 liters) in a 2-liter flask immersed in a Dry Ice alcohol bath. 100 grams of cuprous chloride (Baker & Adamson C.P. cuprous chloride) was added and the flask was stirred for 2 hours at —20° C. Undissolved cuprous chloride was allowed to settle out and a clear about 12 wt. percent CuCl solution was decanted and introduced into a pot at —20° C. Six ft.$^3$ of gaseous butadiene was added over a period of about 2.5 hours with stirring and the temperature rose to —5° C. during precipitation. A yellow complex precipitate appeared almost immediately and this continued to grow in quantity to a yellow slurry. Excess butadiene and butene-1 were evaporated off and a fine granular yellow powder remained. This material was found to have the theoretical amount of butadiene for the 2CuCl:1 butadiene complex. The particles were found to have excellent large pore porous structure and good particle size along with good activity and capacity.

This example indicates that faster rates of butadiene addition can be used with butene-1 solutions of lower concentrations of cuprous chloride or bromide because the driving force for nucleation is less with a less concentrated solution.

EXAMPLE 2A.—GASEOUS BUTADIENE SLOWLY ADDED TO A 12 WT. PERCENT BUTENE-1 SOLUTION OF TECHNICAL GRADE (85%) B&A CuCl

The same general procedure as described in Example 2 was used except that 15 cu. ft. of butene-1 (1.42 liters) was condensed and 125 grams of B&A technical grade cuprous chloride was used. The amount of butadiene charged was 18 ft.$^3$ over a 2.5 hour period. This material also had relatively poor large poor porosity and also had too small a particle size, i.e. mostly 5 microns and very poor fluidization properties. This example indicates that even with a lower concentration of cuprous salt in butene-1 (to obtain a low driving force for nucleation) it is desirable to start with high purity cuprous chloride or cuprous bromide to obtain proper growth of large regular particles. Additionally, apparently slow growth (low driving force for nucleation) should be accompanied by use of high purity CuCl or CuBr to prevent impurities from blocking the desired growth of excellent large pore porous structure.

EXAMPLE 3.—GASEOUS BUTADIENE SLOWLY ADDED TO A WATER SATURATED 24 WT. PERCENT BUTENE—1 SOLUTION OF B&A C.P. CuCl

The same general procedure was used as described in Example 1 except that 9 cu. ft. of butene-1 (0.84 liter) was condensed and 200 grams of cuprous chloride was used at —10° C. After decanting the clear solution, 20 cc.

of distilled water was added to saturate it with water. 2 ft.³ of butadiene was bubbled through distilled water to saturate it and was slowly added beneath the surface of the CuCl solution. Large pore particles of a fairly large average size of approximately 30 microns were obtained. This example indicates that the presence of water does not adversely affect the precipitation.

EXAMPLE 4.—GASEOUS BUTADIENE SLOWLY ADDED TO A 6.8 WT. PERCENT ISOBUTYLENE SOLUTION OR B&A C.P. CuCl

The same general procedure as in Example 1 was used except that 6 ft.³ of isobutylene (0.56 liter) rather than butene-1 was used and the amount of B&A C.P. cuprous chloride was 28 grams. The temperature was $-15°$ C. 5.8 ft.³ of butadiene was added slowly and after about 5 minutes of butadiene addition the solution began to become cloudy and turn yellow (i.e. slow precipitation occurring). Further addition of butadiene formed the slurry of yellow crystals. The particles were found to have good large pore porosity activity and capacity and good regular spherical particle size (average 80 microns) and good fluidization properties. This example indicates that slow precipitation from isobutylene to produce good size particles is much more easily effected (i.e. higher butadiene addition rates are permissible) than with butene-1 because of the higher solubility of the complex in the former.

EXAMPLE 5.—GASEOUS BUTADIENE MODERATELY SLOWLY ADDED TO A 7.3 WT. PERCENT ISOBUTYLENE SOLUTION OF B&A C.P. CuCl

The same general procedure as in Example 1 was used except 175 grams of isobutylene (0.26 liter) and 17.5 grams of cuprous chloride were used. A clear solution was decanted at $-10°$ C. into a second flask at $-25°$ C. 1 cu. ft. of butadiene was then fed with stirring in 20 minutes. Of this 0.34 ft.³ was absorbed. 175 grams of the complex were recovered. Particles were found to have good large pore porosity and size (80–125μ average 100 microns, no fines). However, microscopic examination indicated that there were very nobby (i.e. like a Fischer molecular model). This example indicates that the rate of addition is considerably less critical with respect to isobutylene than butene-1 but that less regular spherical particles are still obtained with faster rates than with lower rates. It is noted that in addition to isobutylene having a higher solubility for the complex, the concentration of cuprous chloride in solution is also less with respect to isobutylene and that this also favors formation of large particles. It is noted that these nobby particles are less perfect and therefore have less strength and are less preferred than those obtained at slower rates of butadiene addition.

EXAMPLE 6.—GASEOUS BUTADIENE SLOWLY ADDED TO AN 8.7 WT. PERCENT ISOBUTYLENE SOLUTION OF B&A C.P. CuCl

Two batches of active CuCl were prepared as described below and were combined and tested in fluid bed tests on crude butadiene from steam cracking. Both batches were prepared by adding to CuCl approximately 1500 ml. of liquid isobutylene at $-15°$ C., and stirring for two hours and then filtering. To the filtered solution was added an additional 150 ml. of liquid isobutylene and the final solutions contained about 8.7 wt. percent CuCl. Butadiene was bubbled into each solution at a slow addition rate (2 to 3 hours to stoichiometric) and then for an additional time until about 1.5 times the stoichiometric amount had been added. 70 and 98.8 grams of the 2CuCl:1 butadiene complex respectively were recovered by filtration. The particles recovered were regular spheres of good size, 80 to 150μ approximately. The combined batches were tested in a fluid bed (no glass beads added to aid fluidization) operated on crude butadiene from steam cracking (31 wt. percent butadiene, 52 wt. percent isobutylene plus butene-1, the remainder being mainly paraffins but also containing other butenes and acetylenes) and was found to have excellent fluidization. Capacity and activity at 0° C. atmospheric pressure in an 11″ depth of fluid bed at 0.3 ft./sec. gas feed rate were 65–75% of theoretical (2CuCl:1 butadiene complex) and 69–73% removal of butadiene. This example presents a highly preferred procedure for preparing excellent active CuCl particles.

EXAMPLE 7.—COMPARISON OF THE PHYSICAL PROPERTIES AND FLUID BED PERFORMANCE OF THE CuCl and CuBr PREPARED IN PRECEDING EXAMPLES The present example presents a comparison of the physical properties and performance in fluid bed tests on crude butadiene from steam cracking of the CuCl or CuBr prepared in a number of the preceding examples. The fluid bed tests were conducted in a 27.5 inch length vertical glass reactor tube 28 mm. in diameter contained in a glass heating-cooling jacket. Approximately 80 to 140 (in various runs) gms. of the CuCl to be tested were charged (usually as the complex to prevent any deactivation by water in the air) along with approximately 100 gms. of Scotchlite glass beads to the reactor tube at room temperature. The reactor was then heated to approximately 90° C. while fluidizing with nitrogen to dissociate the complex (fluidized bed depth was 12–20 inches). After no more butadiene was detected in the tail gas (measurement by gas chromatography) the supply of nitrogen was cut off and measurement was made of the amount of material present in the original complex (by condensing the total effluent gases from the fluid bed in a Dry Ice trap during the dissociation step.

The reactor tube was then cooled to 0° C. and crude butadiene from steam cracking (31 wt. percent butadiene, 52 wt. percent isobutylene plus butene-1, the remainder being mainly paraffinic but also containing other butenes and acetylenes) was charged for one hour (temperature of the bed was about 10° C. above the temperature of the cooling jacket during the first 15–30 minutes for the good materials tested). The activity of the CuCl tested was determined by difference between the butadiene content of the feed and tail gases measured during the first 15 minutes of the run (additional analyses showed that this activity was essentially constant to capacity which was reached for the good materials in the first 15 to 30 minutes). Following absorption, i.e. charging of crude butadiene for one hour the bed was purged with 0.3 ft.³ of nitrogen at 0° C. to remove unreacted materials and then the bed was heated to 80° C. to effect decomplexing (no extraneous fluidization gases used except near end of the period when nitrogen was again supplied to make sure desorption was complete). The butadiene decomplexed was recovered in a Dry Ice trap and measured to determine the percent of theoretical capacity reached (theoretical capacity is 1 mol of butadiene for 2 mols of CuCl). It is noted that the above described absorption and desorption steps were repeated at least 3 times and that the activity (percent recovery) and capacity (percent of theoretical) results reported in the table presented below are for the third cycle (similar results were obtained for the first cycle where such measurements were made). The absorption gas residence times reported were calculated from the gas flow rates assuming that the gas volume in the fluid bed was equal to the difference between the volume of the fluidized bed and the volume of the slumped bed.

COMPARISON OF THE PHYSICAL PROPERTIES AND FLUID BED PERFORMANCE OF THE CuCl and CuBr PREPARED IN PRECEDING EXAMPLES

| | Orig. Complex percent of Theo. (1) | Gas Res. Time, sec. | Fluid Bed Operation 3rd Cycle on Butad. (2) | | Particle Size, $\mu$ | Pore Volume, cc./g. by Porosimeter | | | | Fluidization. |
|---|---|---|---|---|---|---|---|---|---|---|
| | | | | | | | Hg | | | |
| | | | Cap. percent | Rec. percent | | $CCl_4$, <800 A. | 70–550 A. | 550–10,000 A. | >10,000 | |
| Gaseous Butadiene Slowly Added to a 12 wt. percent (sat'd) butene-1 solution of B&A C.P. CuCl, Ex. 2. | 100 | 1 | 71 | 85 | 20/100 | Nil | 0.010 | 0.141 | 0.230 | Good. |
| Gaseous Butadiene Added (Faster Rate) to a 24 wt. percent (sat'd) butene-1 solution of Baker's CuCl, Ex. 1A. | 97 | 0.8 | 76 | 64 | 45/40 | 0.01 | 0.004 | 0.149 | 0.676 | Very poor. |
| Gaseous Butadiene Slowly Added to a 24 wt. percent (sat'd) butene-1 sol'n of Technical Grade (85%) B&A CuCl, Ex. 1B. | 98 | 1 | 63 | 25 | 45/80 | Nil | 0.009 | 0.057 | 0.964 | Do. |
| Gaseous Butadiene Slowly Added to a 24 wt. percent butene-1 sol'n of B&A C.P. CuCl, Ex. 1. | 100 | 1.2 | 81 | 92 | 70/150 | Nil | 0.005 | 0.213 | 0.244 | Good. |
| Gaseous Butadiene Slowly Added to a 12 wt. percent butene-1 sol'n of Technical Grade (85%) B&A CuCl, Ex. 2A. | 99 | 1 | 78 | 22 | 45/35 | 0.01 | 0.012 | 0.070 | 0.868 | Very poor. |
| Gaseous Butadiene Slowly Added to a water sat'd 24 wt. percent (sat'd) butene-1 solution of B&A C.P. CuCl, Ex. 3. | 84 | 0.6 | 75 | 68 | 10/50 | Nil | 0.002 | 0.141 | 0.443 | Good. |
| Gaseous Butadiene Slowly added to a 6.8 wt. percent (sat'd) isobutylene sol'n of B&A C.P. CuCl, Ex. 4. | 100 | 1–2 | (3)65 | (3)60–80 | 50/125 | Nil | 0.008 | 0.237 | 0.023 | Do. |
| Gaseous Butadiene Moderately Slowly added to a 7.3 wt. percent (sat'd) isobutylene solution of B&A C.P. CuCl, Ex. 5 | 100 | | | | 80/125 | | | | | |

(1) Theoretical complex is 2 mols Cu:1 mol complexing material except olefins and CO 1:1.
(2) The activity of the CuCl remains essentially constant throughout the solid residence time until the capacity is reached and then drops to zero.
(3) Fluidization was without fluidization aid glass beads.
(4) Mostly 5.

NOTE.—It is noted that in the above table reference to saturated solutions means merely that relatively large amounts of CuCl were used. Other experiments indicate that much larger amounts can be dissolved EXAMPLE 8.—ACTIVE CuBr PREPARED FROM MONOOLEFINS Separate saturated solution of Mathieson CuBr in butene-1 and in isobutylene at −60° C. were prepared. C.P. butadiene was then added to the solution and in each case the solution precipitated out yellow butadiene-CuBr complexed crystals. The hydrocarbons were removed by evaporation and microscopic examination showed that the particles prepared from isobutylene solution were uniform 10–40$\mu$ single needles and macroparticles composed of e.g. 2–6 microparticles (10–40$\mu$ length) needles, and from butene-1 the particles were 40–300$\mu$ macroparticle balls of <5$\mu$ microparticles. Both materials upon dissociation under the microscope showed the typical highly porous structure of this invention. This example indicates that the preferred CuBr larger >50$\mu$ macroparticle spheres composed of <5$\mu$ microparticles are preferably prepared from butene-1 or a low solubility (for the comples) monoolefin rather than a higher solubility (for the complex) monoolefin such as isobutylene, pentene-1 and hexene-1.

EXAMPLE 9.—LIQUID vs. GASEOUS BUTADIENE SLOWLY ADDED TO ISOBUTYLENE SOLUTIONS OF B&A C.P. CuCl AND EFFECT OF PREFILTRATION

Presented below is a table describing seven runs made under varying conditions. In the first five runs 1500 ml. of liquid isobutylene was used and to this was added an amount of Baker & Adamson (B&A) C.P. cuprous chloride equal to the concentration of CuCl indicated in the table. The solution was stirred at −18° C. for about 2 hours in a 2 liter resin pot to effect solution of the CuCl. The stirrer was of the anchor type approximately 3″ in diameter located 1/8″ from the bottom of the vessel revolving at a rate of 332 r.p.m. While stirring was continued, approximately 1.5 times the stoichiometric amount of butadiene (liquid in Run 1 and gaseous butadiene in Runs 2–5) for the 2CuCl:1 butadiene complex was next added at a constant rate as indicated (times to supply the stoichiometric amount). The temperature was −18° C. and additional cloudiness due to the formation of precipitated complex appeared immediately in Run 1 and began to appear after about 10 minutes in Runs 2–5. Following precipitation, excess butadiene and isobutylene were removed by filtration and the granular yellow powder remaining was decomplexed in a vacuum oven.

With respect to Runs 6 and 7, 2000 ml. of liquid isobutylene was used to which was added B&A C.P. CuCl and the solution was clarified by decanting prior to addition of butadiene. 1500 ml. of solution of the concentration indicated (CuCl added minus CuCl recovered in filtering) was transferred to the precipitator. In Runs 6 and 7 the yellow cloudiness due to formation of the complex did not begin to appear until about 15 minutes due to the lack of nucleation on residual cuprous chloride particles which were present in Runs 2 through 5. Roller analyses gave the particle size indicated.

| Run | Filtered | Conc. of CuCl, Wt. percent | Time to add Stoichiometric | Weight percent Particle Size, μ | | | | | |
|---|---|---|---|---|---|---|---|---|---|
| | | | | 0-10 | 6-20 | 20-50 | 50-70 | 75-120 | 100+ |
| 1 | No | 5.3 | 1 min | (¹) | | | | | |
| 2 | No | 8.6 | 2 hrs | 0.00 | 0.17 | 2.10 | 86.09 | 26.78 | 2.85 |
| 3 | No | 8.6 | 4 hrs | 7.09 | 1.16 | 7.20 | 79.34 | 3.61 | 1.60 |
| 4 | No | 6.0 | 2 hrs | 1.11 | 2.47 | 1.96 | 57.00 | 29.46 | 8.00 |
| 5 | No | 6.0 | 4 hrs | 3.99 | 3.62 | 3.20 | 70.21 | 11.08 | 7.90 |
| 6 | Yes | 8.6 | 2 hrs | 0.00 | 0.05 | 0.17 | 4.28 | 3.09 | 92.41 |
| 7 | Yes | 8.6 | 1 hr | 0.00 | 0.24 | 1.16 | 5.25 | 2.79 | 90.56 |

¹ No roller analysis. Particle size determined under microscope, 5-20μ, mainly 5-10μ. Extremely difficult fluidization even with glass beads added.

NOTE.—This example indicates that liquid butadiene added rapidly produces very fine particles which are extremely difficult to fluidize. It also indicates that prefiltration is not necessary if the gaseous butadiene is added slowly, i.e. to produce particles of fairly large size which can be fluidized, but that larger particles and aptimum fluidization are obtained by both prefiltering and slow addition of gaseous butadiene.

EXAMPLE 10.—SOLUBILITIES OF 2CuCl:1 BUTADIENE COMPLEX IN BUTENE-1 AND ISOBUTYLENE 2 grams of a sample of 2CuCl:1 butadiene complex active particles (100% complex) were stirred for one hour in 148 cc. of isobutylene at −10° C. Undissolved particles were allowed to settle and four 20 ml. samples were put in weighing bottles and allowed to evaporate off. The complex remaining was measured. The solubility for the four samples averaged 0.52±0.03 wt. percent.

The same general procedure was used with butene-1 and the solubility was found to be 0.00 wt. percent at −7° C.

The solubility, i.e. 0.52 wt. percent of the complex in isobutylene explains why faster rates of precipitation are permissible with respect to this solvent. Thus, the butadiene added with stirring goes into solution and precipitation is from a thoroughly mixed gradient above the solubility, i.e. supersaturation. With respect to the butene-1 since the complex has 0.00 wt. percent solubility localized precipitation occurs at the points where butadiene is admitted before stirring can create a uniform solution from which large particles can grow. Thus, with respect to butene-1 instantaneous nucleation occurs into very fine particles unless extremely slow rates of addition are utilized. It should also be note that due to the small solubility little re-solution (partial dissolving) of particles or growth on particles occurs because of the extremely low solubility of the complex.

It is significant that the permissible rates with respect to isobutylene are higher than for the acid techniques such as addition of water to the complex in concentrated HCl solution because with respect to the latter the water antisolvent droplet creates local high insolubility and thus nucleation spreads out (is stirred into the solution). With respect to isobutylene, the gaseous butadiene bubble forms a much smaller complex droplet which spreads out (is stirred into the solution) without appreciable nucleating before the concentration of 0.52% (or higher due to supersaturation) is reached in the total solution. Also, with respect to isobutylene re-solution of particles and growth, this occurs from the at least 0.52% concentration of complex in solution. Similar determinations were made of the solubility of the complex particles in pentene-1 and hexene-1 as follows: 0.26 wt. percent in pentene-1 at 0° C. (0.15 wt. percent at 13° C.) and 0.42 wt. percent in hexene-1 at −10° C. It was also found that precipitation from these materials appeared to be similar to isobutylene.

EXAMPLE 11.—PREPARATION FROM PENTENE-1 SOLUTION

A solution of CuCl in pentene-1 was prepared by stirring for 1 hr. 90 g. of Bower Chemical 97.4% pure CuCl (powder) in 908 g. of Phillips pure grade pentene-1 at 10° C. The solution was warmed to 17° C. and without filtering the addtion of gaseous butadiene was begun. Two equivalents of butadiene were added over 2½ hours and by this time the temperature had reached 23° C. The precipitate which had formed was filtered and fluffed with butadiene to remove pentene-1. The resulting material had about 75% of the particles in the 80 to 150μ size range and fluidized well at 0.3 ft./sec. This material showed a capacity of 72.5% of theoretical capacity.

EXAMPLE 12.—DEMONSTRATION OF ATTRITION RESISTANCE OF HYDROCARBON PREPARATION

This example is included to illustrate the attrition resistance of adsorbent prepared using the hydrocarbon system. The CuCl adsorbent was prepared in the manner described in Example 6 using isobutylene, i.e. 80 to 150 micron particles. Enough of this adsorbent was charged to 2 inch captive fluid bed reactor to have a 10 ft. bed height. Complexing and decomplex with butadiene was carried out under pressure at 22 p.s.i.g. and 100° F. When complexing and decomplexing was initiated some attrition did occur in the first few cycles with the percent fines (under 20 micron sized particles) increasing rapidly for the first few cycles and then decreasing to a low constant value. This data is summarized in the following tables.

Cycles: Wt. percent of particles under 20μ
1 _____ 1.0
5 _____ 17.2
10 _____ 12.3
15 _____ 3.4
20 _____ 3.3
25 _____ 3.2
30 _____ 0.5
35 _____ 2.8
40 _____ 0.9
48 _____ 1.2
56 _____ 0.7

It is noted that the extreme resistance to attrition of these 80–150μ spherical macroparticles of microparticles of less than 5μ even in operations near the dew point with butadiene containing butenes makes these particles highly preferred for commercial separations.

EXAMPLE 13.—PREPARATION OF OTHER ACTIVE COMPLEXES OF CuCl FROM HYDROCARBON SOLUTION

In each case a 50 cc. portion decanted from a saturated solution of B&A C.P. (98.6%) CuCl in butene-1 at −25° C. was saturated with the following ligands at −25° C.

Methylacetylene
Allene
Carbon monoxide
Piperylene

No precipitate formed in any case even when the solution was allowed to warm up to its boiling point. However, by evaporating off the butene-1 solution of excess ligand, a precipitate was finally obtained in each case which appeared under the microscope to be complex and not CuCl. By adding n-heptane or isopentane to the above solutions (second set of preparations) the complex could be readily precipitated. Any paraffin from $C_3+$ should be effective as a precipitation solvent. The difficulty in precipitation was probably due to the, slightly cloudy appearance of the decanted solution. All samples upon dissociation under the microscope showed the typical highly porous structure of active CuCl.

A third set of 50 cc. samples of the saturated solution was prepared from a filtered solution of CuCl in butene-1 at −25° C. Each sample was saturated with the same ligands as above and in each case a precipitate of the ligand complex with CuCl was obtained without the addition of antisolvent. Apparently high supersaturations can sometimes be relatively stable in butene-1 solutions of CuCl while at other times precipitation readily occurs.

EXAMPLE 14.—MICROSCOPIC PICTURES OF ACTIVE CuCl PARTICLES FROM LARGER SCALE ISOBUTYLENE PREPARATIONS

Figure 10:
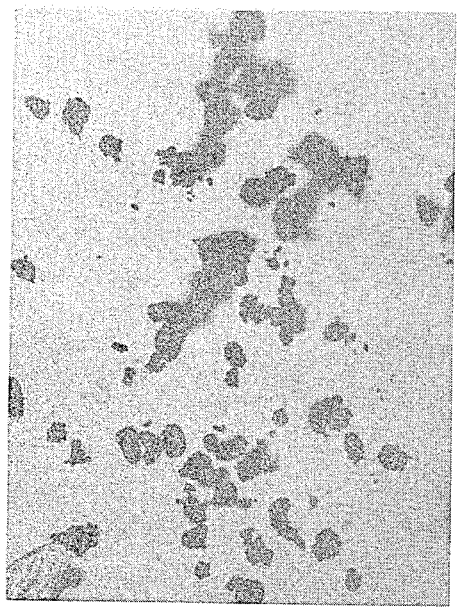

Two batches of active CuCl were prepared from B&A segregated CuCl in a large stirred kettle. In the first preparation 10 lbs. of CuCl were added to 100 lbs. of liquid isobutylene and the mixture was stirred at 0° F. for 2 hrs. to dissolve CuCl. The solution was then filtered to remove undissolved solids and 10.2 lbs. of liquid butadiene was already added in a turbulent region of the stirred kettle to the clear solution at 0° F. over a period of 0.3 hour. A microscope picture (transmitted light) of the particles obtained, a magnification 200× (scale 1 mm.=5$\mu$) is presented as accompanying FIGURE 10. This picture shows that the particles are very irregular, very small particles 15–30$\mu$ with the larger particles being particularly irregular. Fluidization (no glass head fluidization aide) was found to very poor with approximately 5% balling in the balls of 1–2 mm. and high losses of fines on the filters.

Figure 11:
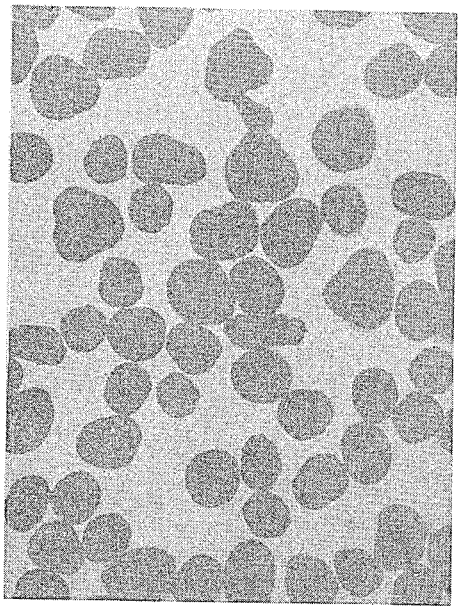

The same general procedure was used in the second preparation except that 6.5 lbs. of CuCl was added to 64 lbs. of liquid isobutylene. After filtration the concentration was found to be 6.61 wt. percent. Gaseous (rather than liquid) butadiene was added in a turbulent region of the kettle, 5.1 lbs. over a period of 1.75 hours. A similar microscopic picture of the particles obtained is presented as FIGURE 11. As can been seen the particles are regular uniform spheres of 40–60$\mu$ size. The particles (without fluidization aids) were found to exhibit excellent fluidization properties, i.e. no balling, no excessive fines on the filters. However, the particles are somewhat smaller than optimum. This now shows that good results are obtained using slow addition of gaseous butadiene with filtration and efficient stirring.

Figure 12:
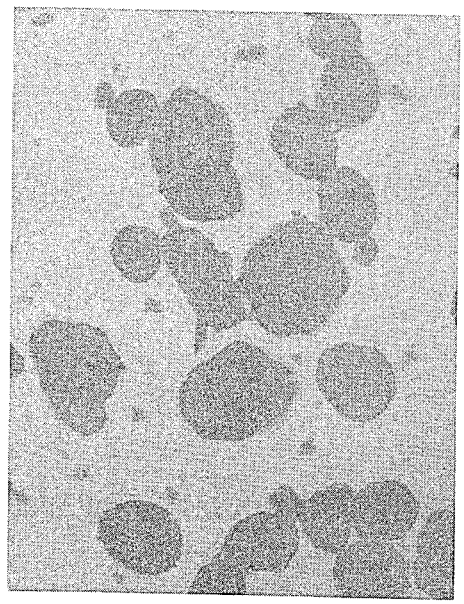

FIGURE 12 shows a microscopic picture of CuCl particles from another large isobutylene preparation similar to those above. The particles are longer, i.e., 70–100$\mu$. A sample from this batch was found to have excellent attrition resistance in sustained fluid bed complexing-decomplexing tests, i.e. at least 30 cycles. In addition, the balls became extremely regular spheres.

In this specification and in the appended claims the terms "absorption" and "desorption" are used in their ordinary meanings in this art, viz. to designate respectively the chemical combination of cuprous chloride or bromide with a material to form an addition compound or complex with it, preferably a complex, and the decomposition of said addition compound to regenerate said material. The term "Pi complex" is employed herein to mean a complex of the type referred to in "Mechanisms of Inorganic Reactions" by Basolo and Pearson, pp. 183–185, published by John Wiley, 1958.

It is to be understood that this invention is not limited to the specific examples, which have been offered merely as illustrations, and that modifications may be made without departing from the spirit of this invention.

What is claimed is:

1. A process for preparing an active, high large pore porosity, solid cuprous halide complexing agent selected from the group consisting of CuCl and CuBr which comprises precipitating at a rate of less than 1500 g./l./hr. uniform solid particles of a particle size about 10$\mu$ of the cuprous halide complexed with a complexing agent which forms a stable complex with the said cuprous halide having a ratio of copper to complexing agent greater than 1:1 from a monoolefin containing the complexed cuprous halide in solution in concentration of less than 0.1 weight percent and dissociating the complexed cuprous halide particles to obtain the active above 10$\mu$ particle size cuprous halide complexing agent.

2. The process of claim 1 in which the precipitation rate is <500 g./l./hr.

3. The process of claim 1 in which the mono-olefin is butene-1.

4. A process for the separation of a compound capable of forming a complex with a cuprous halide from a mixture containing it other than a mixture containing both a diolefin and appreciable quantities of a monoolefin which comprises contacting said mixture in vapor phase, initially and throughout multiple cycles, with unsupported solid porous unitary particles of a cuprous halide complexing agent selected from the group consisting of cuprous chloride and cuprous bromide, the said particles having a porosity of above 10 percent (of the total volume of the particle) 550–10,000 A. pores and being above 50 percent 10–60$\mu$ macroparticles of less than 5$\mu$ microparticles, under conditions to form a complex between said compound and said complexing agent and subsequently dissociating said complex to recover said compound.

5. The process of claim 4 in which the cuprous halide has a porosity of above 30%, 550–10,000 A. pores.

6. The process of claim 5 in which the cuprous halide is cuprous chloride.

7. The process of claim 4 in which the said particles are continuously circulated in contact with cooling surfaces during formation of the complex.

8. The process of claim 7 in which the said particles are suspended as a dense fluid bed in flowing vapors of the mixture contacted.

9. The process of claim 4 in which contacting to form the complex is carried out at a temperature within 15° C., of the dew point of the mixture contacted.

10. The process of claim 4 in which the mixture contacted is a crude diolefin stream from refinery operations selected from the group consisting of $C_4$ streams, $C_5$ streams, $C_6$ streams and mixtures of these and complexing is carried out at a temperature within 10° C. of the dew point of the stream.

11. The process of claim 10 in which the crude diolefin stream is a crude butadiene stream containing above 20% butenes.

12. The process of claim 4 in which the complexed cuprous halide is treated prior to desorption to substantially completely remove liquids wetting the particle surfaces including the pore surfaces under conditions to prevent any appreciable desorption occurring in said treatment.

13. In a continuous fluidized solids vapor phase process for the separation of a compound capable of forming a complex with cuprous halide from a vaporous mixture contaniing it other than a mixture containing both adiolefin and appreciable quantities of a monoolefin by contacting unsupported cuprous halide, initially and throughout multiple cycles, under conditions to form a complex between said compound and cuprous halide and wherein said complex is subsequently dissociated to generate the complexed compound, carried out utilizing two fluid beds of the cuprous halide, one operated on complexing and one on dissociation and the cuprous halide complexing agent is circulated between the two fluid beds, the improvement which comprises using as the said cuprous chloride complexing agent solid porous unitary particles of a cuprous halide complexing agent selected from the group consisting of cuprous chloride and cuprous bromide, the said particles having a porosity of above 15 percent (of the total volume of the particles) 550–10,000 A. pores and being above 50 percent 20–300$\mu$ macroparticles of less than 5$\mu$ macroparticles of less than 5$\mu$ microparticles.

14. The process of claim 13 in which contacting to form the complex is carried out at a temperature within 10° C. of a dew point of the mixture contacted.

15. The process of claim 14 in which the mixture contacted is a crude diolefin stream from refinery operations selected from the group consisting of $C_4$ streams, $C_5$ streams, $C_6$ streams and mixtures of these.

16. The proces of claim 13 in which dissociated complexing agent is supplied to the top of a fluid bed of the complexing agent operated under complexing conditions and flows downwardly through the said bed countercurrent to upwardly flowing vapors of the vaporous mixture to be separated supplied at the bottom of the fluid bed, and in which complexed complexing agent is withdrawn from the bottom of the fluid bed and is stripped of nonselectively absorbed materials prior to being dissociated.

17. The process of claim 13 in which stripping is conducted by partially dissociating the complexed particles to thereby sweep nonselectively absorbed materials from the surfaces of the pores.

18. The process of claim 13 in which the stripping gas is a portion of the stripped gas recovered from the top of the complexing fluid bed and the desorption gas is a portion of the overhead gas from the top of the second fluid bed operating under dissociated conditions.

19. The process of claim 13 in which the complexed cuprous halide is cuprous chloride and the cuprous chloride is dissociated at temperatures below 110° C. to prevent annealing losses of the large pore porous structure.

References Cited

UNITED STATES PATENTS

| | | | |
|---|---|---|---|
| 2,386,300 | 10/1945 | Drennan et al. | 260—681.5 |
| 2,386,379 | 10/1945 | Wolk | 260—681.5 |
| 2,386,734 | 10/1945 | Wolk | 260—681.5 |
| 2,395,335 | 3/1946 | Soday | 260—681.5 |

DELBERT E. GANTZ, *Primary Examiner.*

G. E. SCHMITKONS, *Assistant Examiner.*

U.S. Cl. X.R.

23—97